(12) United States Patent
Chen et al.

(10) Patent No.: US 9,100,453 B2
(45) Date of Patent: Aug. 4, 2015

(54) SOCIAL DEVICE SECURITY IN A SOCIAL NETWORK

(75) Inventors: Sherman (Xuemin) Chen, Rancho Santa Fe, CA (US); Marcus C. Kellerman, San Diego, CA (US); Wael W. Diab, San Francisco, CA (US); Yasantha N. Rajakarunanayake, San Ramon, CA (US); James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 138 days.

(21) Appl. No.: 13/396,449

(22) Filed: Feb. 14, 2012

(65) Prior Publication Data

US 2013/0091540 A1  Apr. 11, 2013

Related U.S. Application Data

(60) Provisional application No. 61/545,147, filed on Oct. 8, 2011.

(51) Int. Cl.
| | |
|---|---|
| G06F 21/00 | (2013.01) |
| H04L 29/08 | (2006.01) |
| H04L 29/06 | (2006.01) |
| H04W 4/20 | (2009.01) |

(52) U.S. Cl.
CPC .............. *H04L 67/306* (2013.01); *H04L 63/08* (2013.01); *H04L 63/104* (2013.01); *H04W 4/206* (2013.01); *H04L 67/303* (2013.01)

(58) Field of Classification Search
None
See application file for complete search history.

(56) References Cited

U.S. PATENT DOCUMENTS

| | | | |
|---|---|---|---|
| 7,698,380 | B1 | 4/2010 | Amidon et al. |
| 8,234,346 | B2 * | 7/2012 | Rao et al. ...................... 709/207 |
| 2003/0220940 | A1 * | 11/2003 | Futoransky et al. ....... 707/104.1 |
| 2004/0024912 | A1 * | 2/2004 | Fukao et al. ................... 709/249 |
| 2008/0063191 | A1 * | 3/2008 | Hatano et al. ................... 380/45 |
| 2008/0189768 | A1 * | 8/2008 | Callahan et al. .................. 726/4 |
| 2008/0208963 | A1 | 8/2008 | Eyal et al. |
| 2009/0037736 | A1 * | 2/2009 | Djordjrvic et al. ............. 713/170 |

(Continued)

OTHER PUBLICATIONS

Barrett et al, "A Process for Resetting Proxy Authorization Values that are Automatically Cached by Web Browsers Developed for Pervasive Computing Devices", Oct. 1, 1998, IBM, 2 pages (obtained from "ip.com" database).*

(Continued)

*Primary Examiner* — Lisa Lewis
*Assistant Examiner* — Maung Lwin
(74) *Attorney, Agent, or Firm* — Garlick & Markison; Edward J. Marshall

(57) ABSTRACT

A social network (SNET) is divided into one or more circles employing separate security secrets, e.g. keys, for communication between members. A device can be a member of more than one circle, and store different keys for each of those circles in separate, restricted portions of memory. When a member leaves a circle, new keys can be generated and distributed to the remaining members. Before and after joining a circle, a level of trust associated with the device or human member can be determined based on third party trust verification and a trust history. A requirement for multiple current circle members to vouch for the prospective member can be imposed as a condition of membership. Each circle can be assigned different trust and access levels, and authorization to receive information can be checked before transmitting information between circles.

21 Claims, 17 Drawing Sheets

(56) References Cited

U.S. PATENT DOCUMENTS

| | | | |
|---|---|---|---|
| 2009/0249060 A1* | 10/2009 | Dossett et al. | 713/156 |
| 2009/0305667 A1* | 12/2009 | Schultz | 455/410 |
| 2010/0169789 A1 | 7/2010 | Cheng et al. | |
| 2010/0257239 A1 | 10/2010 | Roberts | |
| 2010/0325025 A1* | 12/2010 | Etchegoyen | 705/34 |
| 2011/0093942 A1* | 4/2011 | Koster et al. | 726/7 |
| 2011/0161279 A1 | 6/2011 | Rao et al. | |
| 2012/0023332 A1 | 1/2012 | Gorodyansky | |
| 2012/0032876 A1* | 2/2012 | Tabe | 345/156 |
| 2012/0222093 A1* | 8/2012 | Badenes et al. | 726/4 |

OTHER PUBLICATIONS

European Patent Office; European Search Report; EP Application No. 12006971.1; May 2, 2013; 3 pgs.

Barrett, et al.; A Process for Resetting Proxy Authorization Values that are Automatically Cached by Web Browsers Developed for Pervasive Computing Devices; ip.com; Oct. 1, 1998; 2 pgs.

* cited by examiner

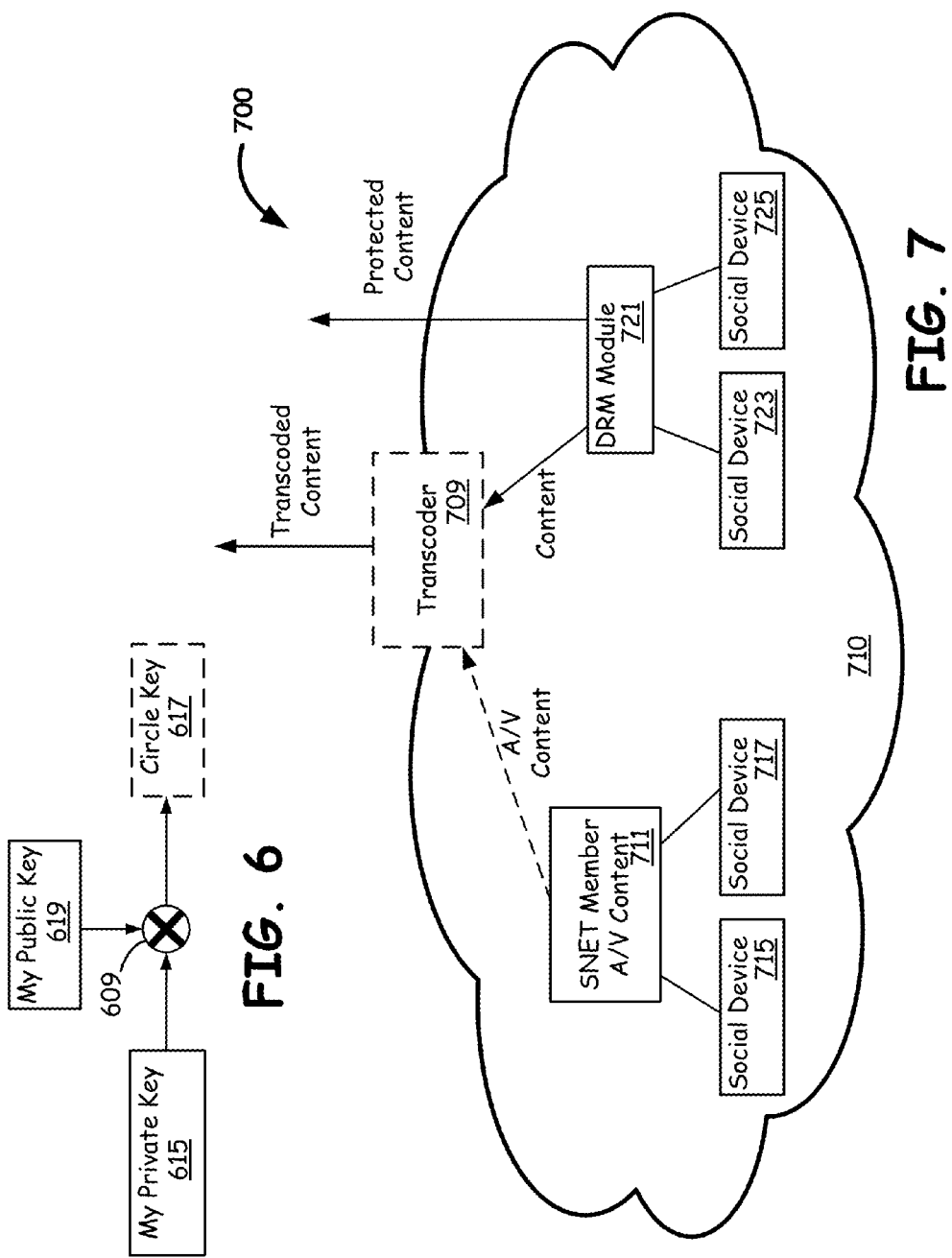

Adaptive Trust Probability = Trust Rating via Probability for a Member Human or Device 1301

Adaptive Trust Probability Contribution from a 1st Human Voucher 1303

Adaptive Trust Probability Underlying the Human Voucher 1311

Inherent Vouching (for/against) Probability Through Interaction With Other Members 1313

Reported Vouching Probability Through Interaction With Other Members 1315

Trusted Authority Contributions (Including Authority Trust as Well) 1317

Adaptive Trust Probability Conferred to Subject Member 1321

Inherent Vouching (for/against) Probability Through Interaction With Subject Member 1323

Reported Vouching Probability Through Interaction With Subject Member 1325

Adaptive Trust Probability Contribution from a Trusted Authority 1331

Adaptive Trust Probability Based on Time & Thoroughness of the Trust Processing 1333

Probability of Authority's Ability to Establishing Justifiable Trust 1335

Probability Associated With the Subject Member, Specifically 1337

Aging & Other Adaptive Probability Update Factors 1339

. . .

FIG. 13

SOCIAL DEVICE SECURITY IN A SOCIAL NETWORK

CROSS REFERENCE TO RELATED PATENTS

This application claims the benefit of U.S. Provisional Application No. 61/545,147, filed Oct. 8, 2011, and entitled "Social Network Device Memberships and Resource Allocation," which is incorporated herein in its entirety by reference for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND

1. Technical Field

This invention relates generally to membership of devices in social networks, and more particularly to security of devices in a social network.

2. Description of Related Art

The popularity and growth of social network sites and services has increased dramatically over the last few years. Existing social network sites include FACEBOOK, GOOGLE+, TWITTER, MYSPACE, YOUTUBE, LINKEDIN, FLICKER, JAIKU, MYUBO, BEBO and the like. Such social networking sites are typically organized around user profiles and/or collections of content accessible by members of the network. Membership in such social networks is comprised of individuals, or groupings of individuals, who are generally represented by profile pages and permitted to interact as determined by the social networking service.

In many popular social networks, especially profile-focused social networks, activity centers on web pages or social spaces that enable members to communicate and share activities, interests, opinions, status updates, audio/video content, etc. across networks of contacts. Social networking services might also allow members to track certain activities of other members of the social network, collaborate, locate and connect with former acquaintances and colleagues, and establish new connections with other members.

Individual members typically connect to social networking services through existing web-based platforms via a computing device and/or mobile smartphone. Members often share a common bond, social status, or geographic or cultural connection with their respective contacts. Smartphone and games-based mobile social networking services are examples of rapidly developing areas.

As the use of social networks continues to proliferate, the limitations of current security measures used in the context of social networks become more of a concern. In many cases, individuals belonging to social networks expect, sometimes mistakenly, believe that reasonably strong security measures have been implemented to prevent unauthorized access to the social network, and that social network members are all trustworthy. As new threats to security of social networks continue to emerge, it becomes apparent that current social network security measures are less than perfect.

BRIEF DESCRIPTION OF THE SEVERAL VIEWS OF THE DRAWING(S)

FIG. 6 is a diagram illustrating how a circle key can be generated according to embodiments of the present disclosure;

FIG. 7 is a diagram illustrating transfer of protected content outside of a social network circle, according to embodiments of the present disclosure;

Figure 9:
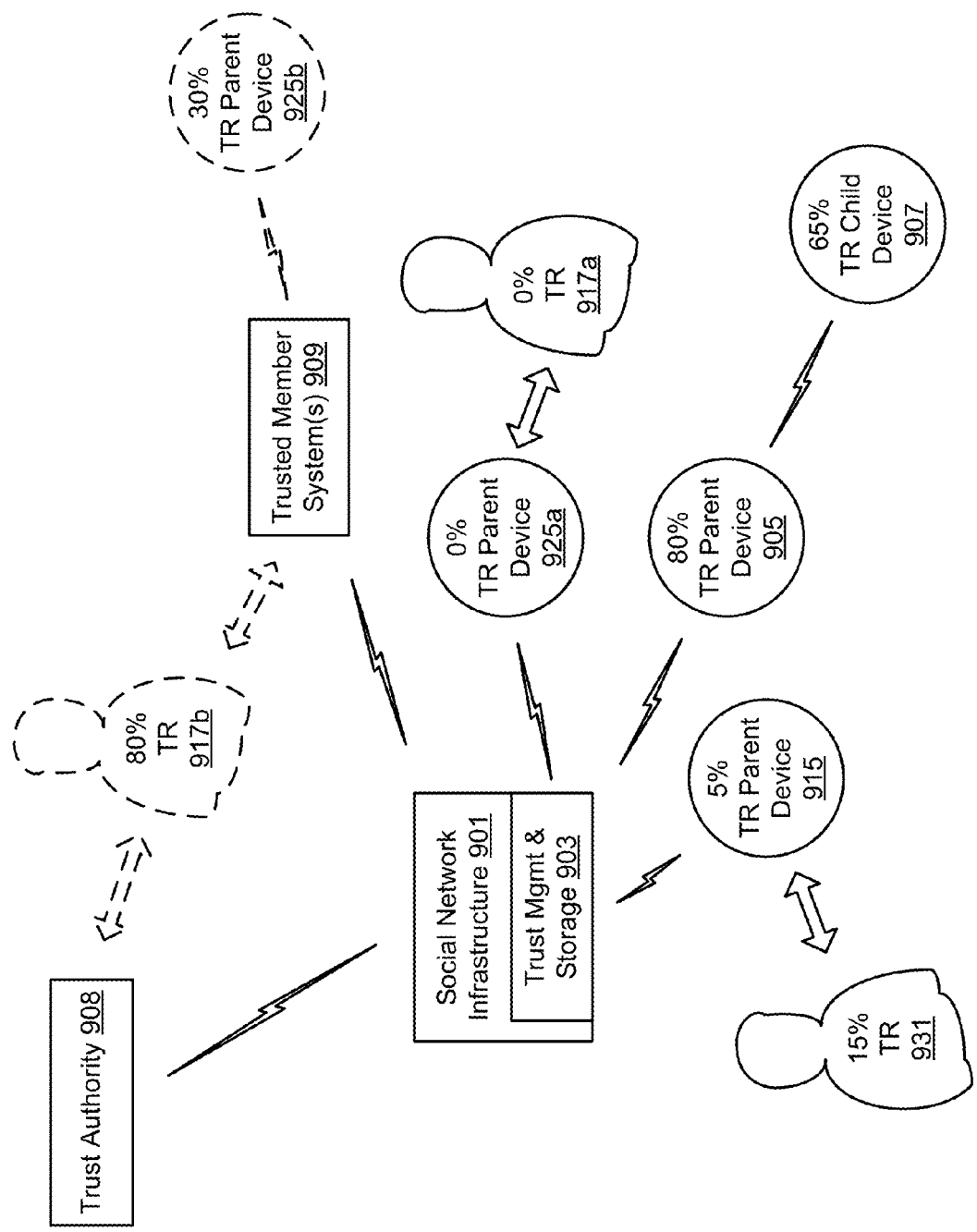
Figure 10:
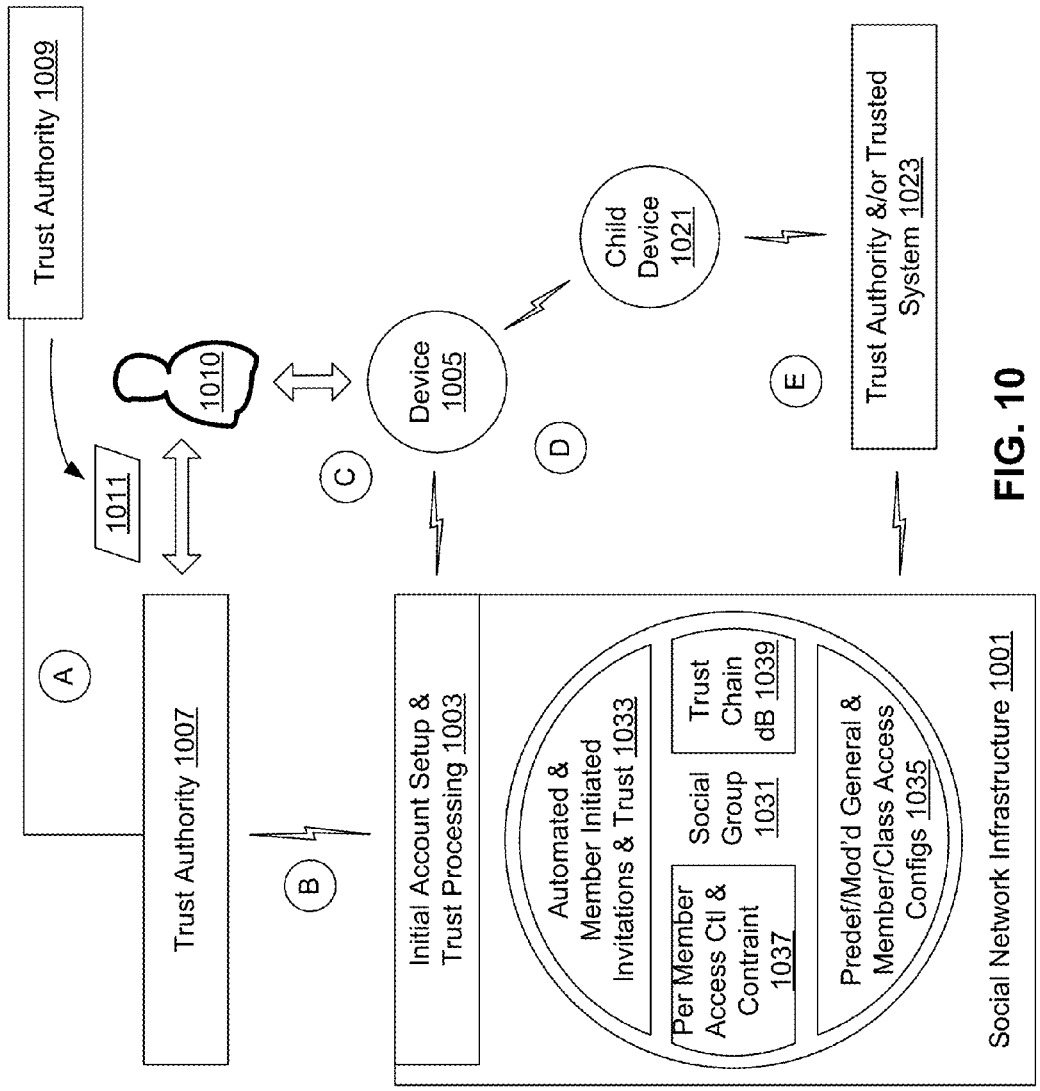
Figure 11:
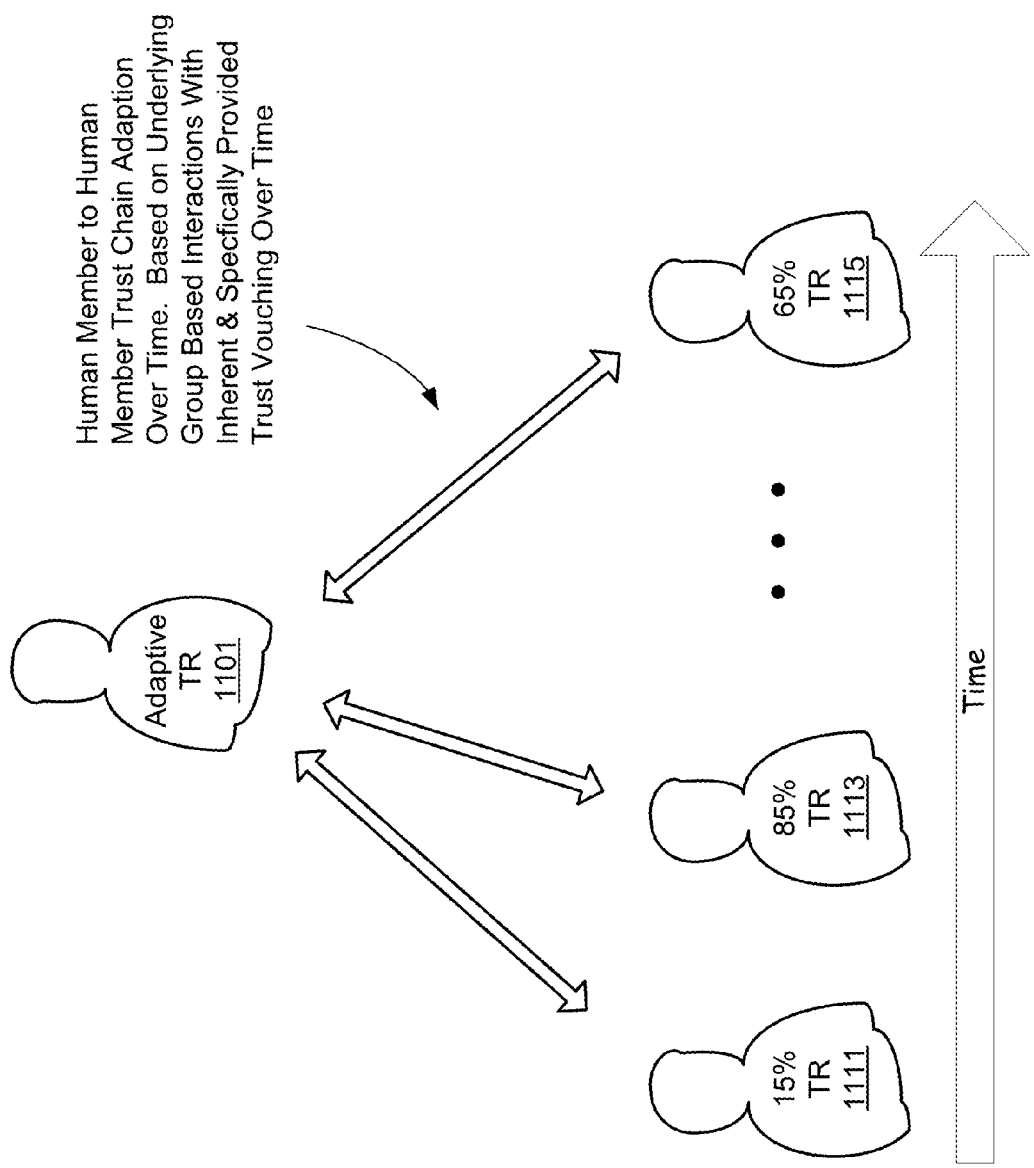
Figure 12:
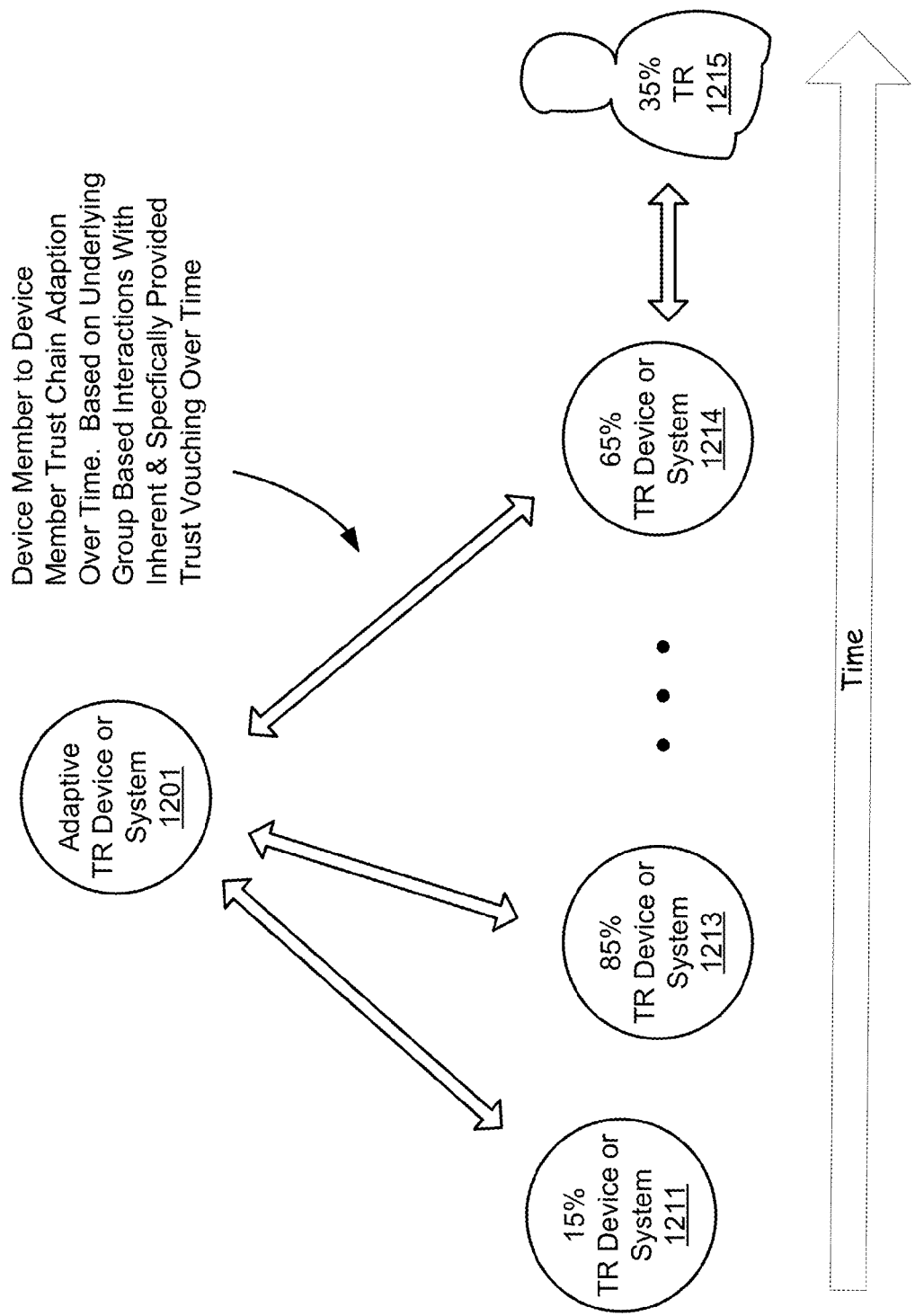
Figure 14:
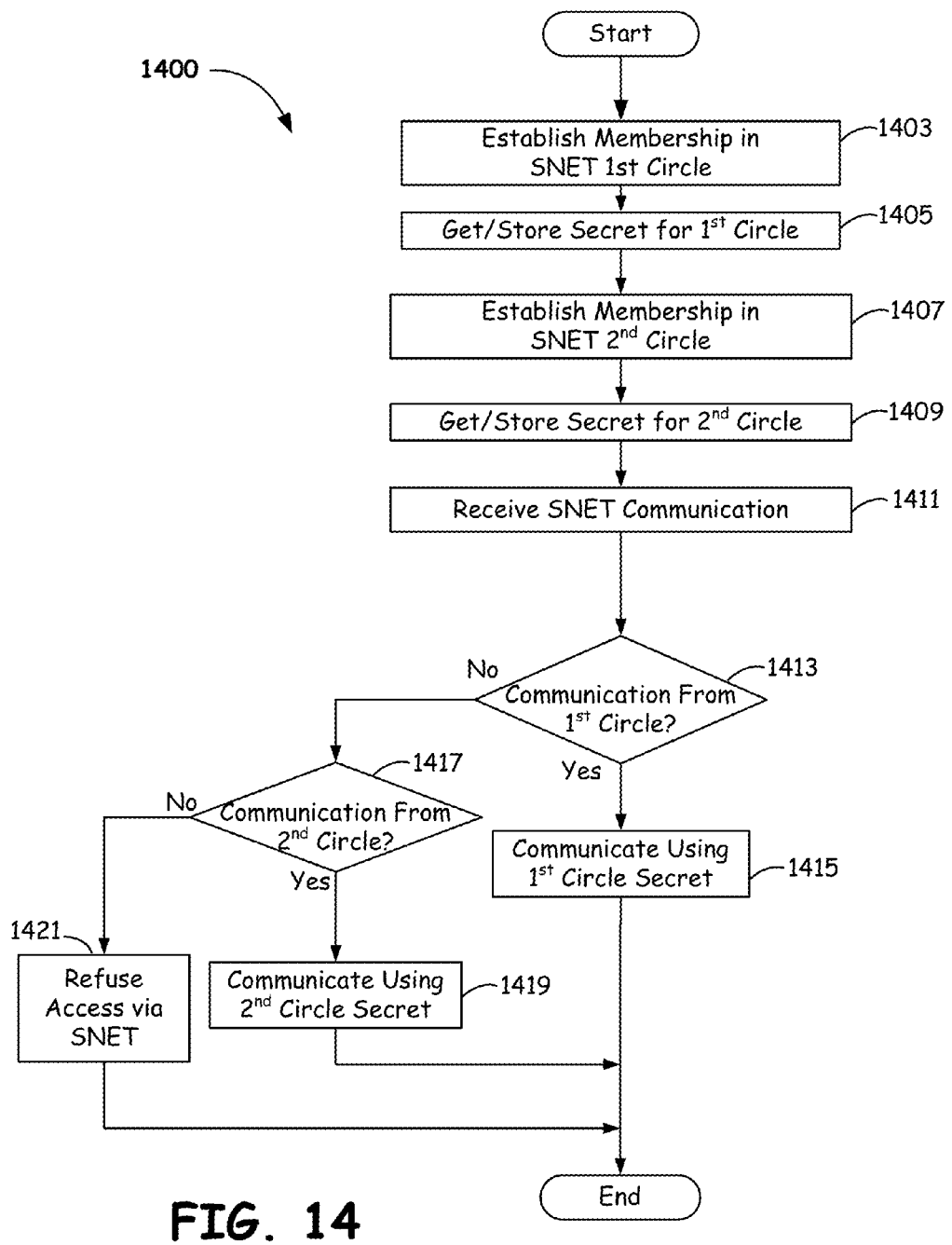
Figure 15:
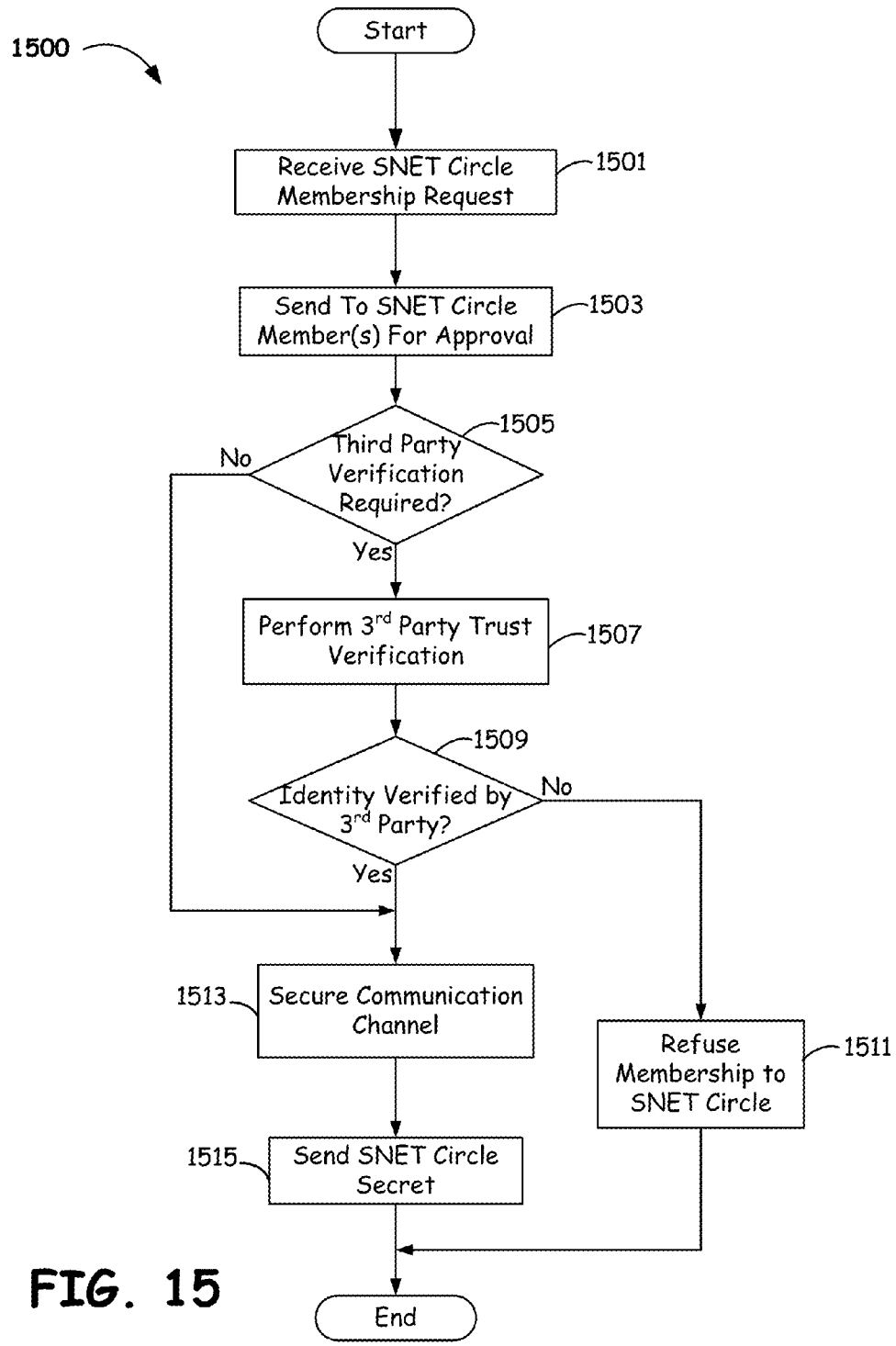
Figure 16:
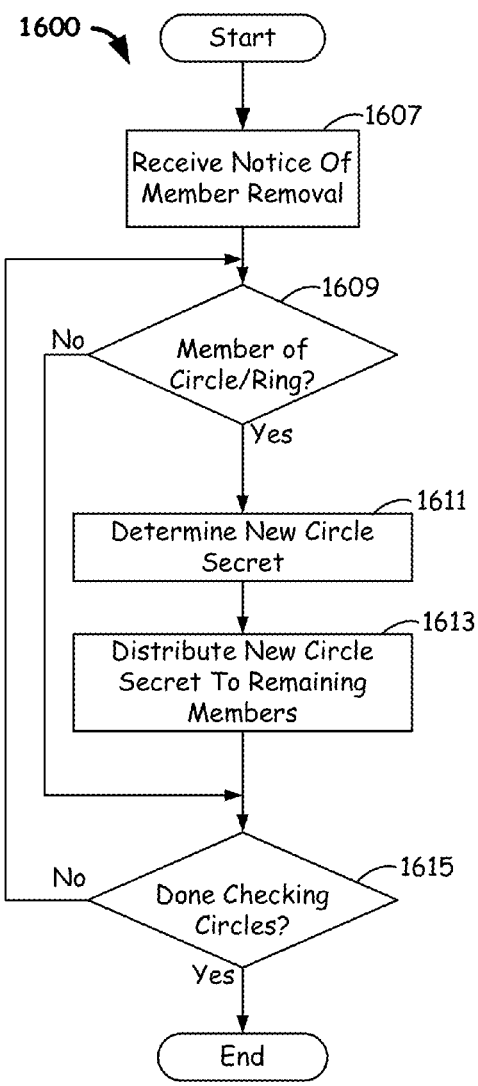
Figure 17:
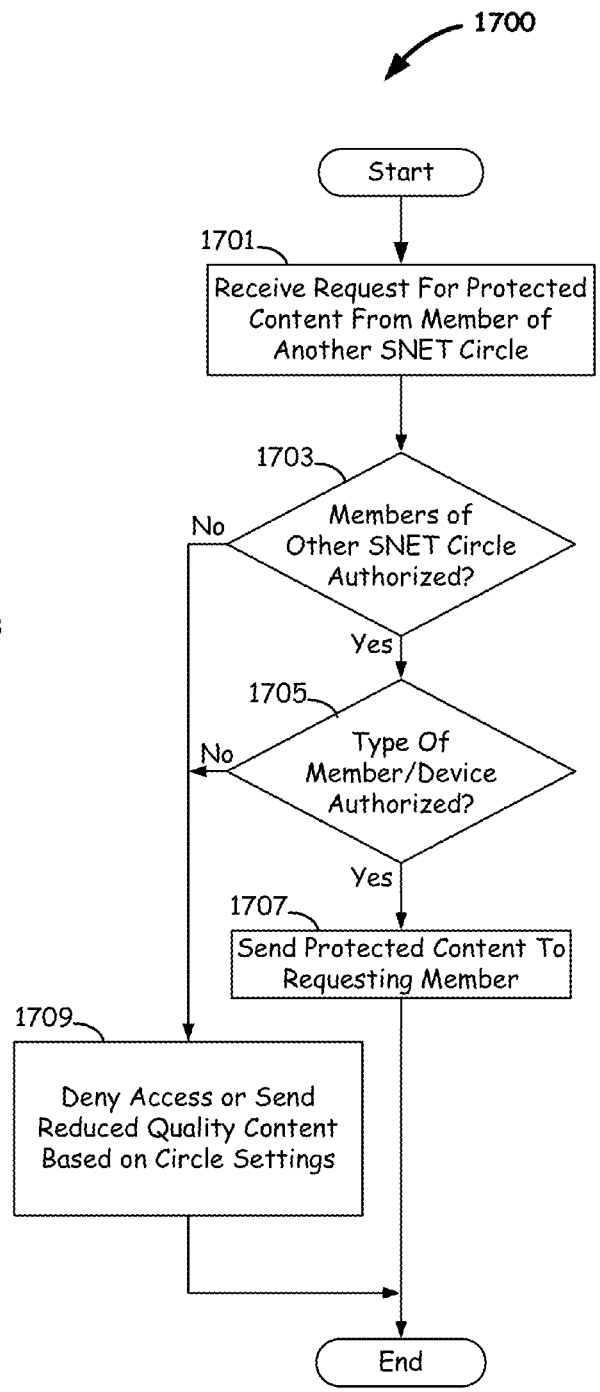

FIG. 9 adaptive levels of trust between different members and member types of social network in accordance with the disclosure;

FIG. 10 is a diagram illustrating establishing and verifying levels of trust and trust chain links according to various implementations of the present disclosure;

FIG. 11 is a diagram illustrating adaptive trust chains with respect to human SNET members according to various embodiments of the disclosure;

FIG. 12 is a diagram illustrating adaptive trust chains involving social devices according to various embodiments of the disclosure;

FIG. 13 is a diagram illustrating nested levels of trust according to various embodiments of the disclosure;

FIG. 14 is a flowchart illustrating a method of securing communications in a device having membership in multiple social network circles, according to embodiments of the present disclosure;

FIG. 15 is a flowchart illustrating verification of potential circle members, according to various embodiments of the disclosure;

FIG. 16 is a flowchart illustrating a procedure for preventing a member removed from a social network circle from accessing circle resources, according to various embodiments of the present disclosure; and FIG. 17 is a flowchart illustrating authorization of non circle-members to receive circle authorized content according to various embodiments of the present disclosure.

Figure 18:
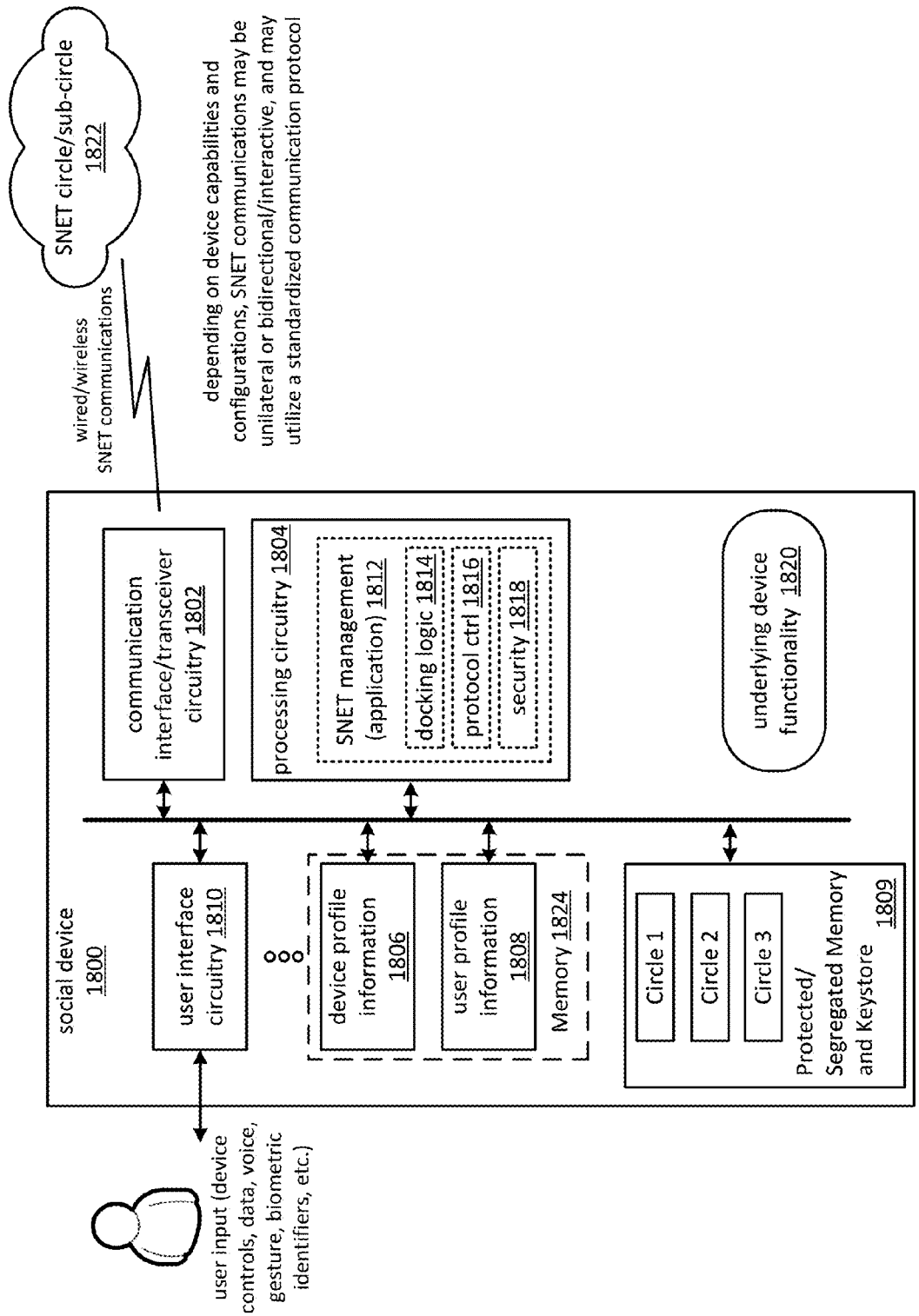
Figure 19:
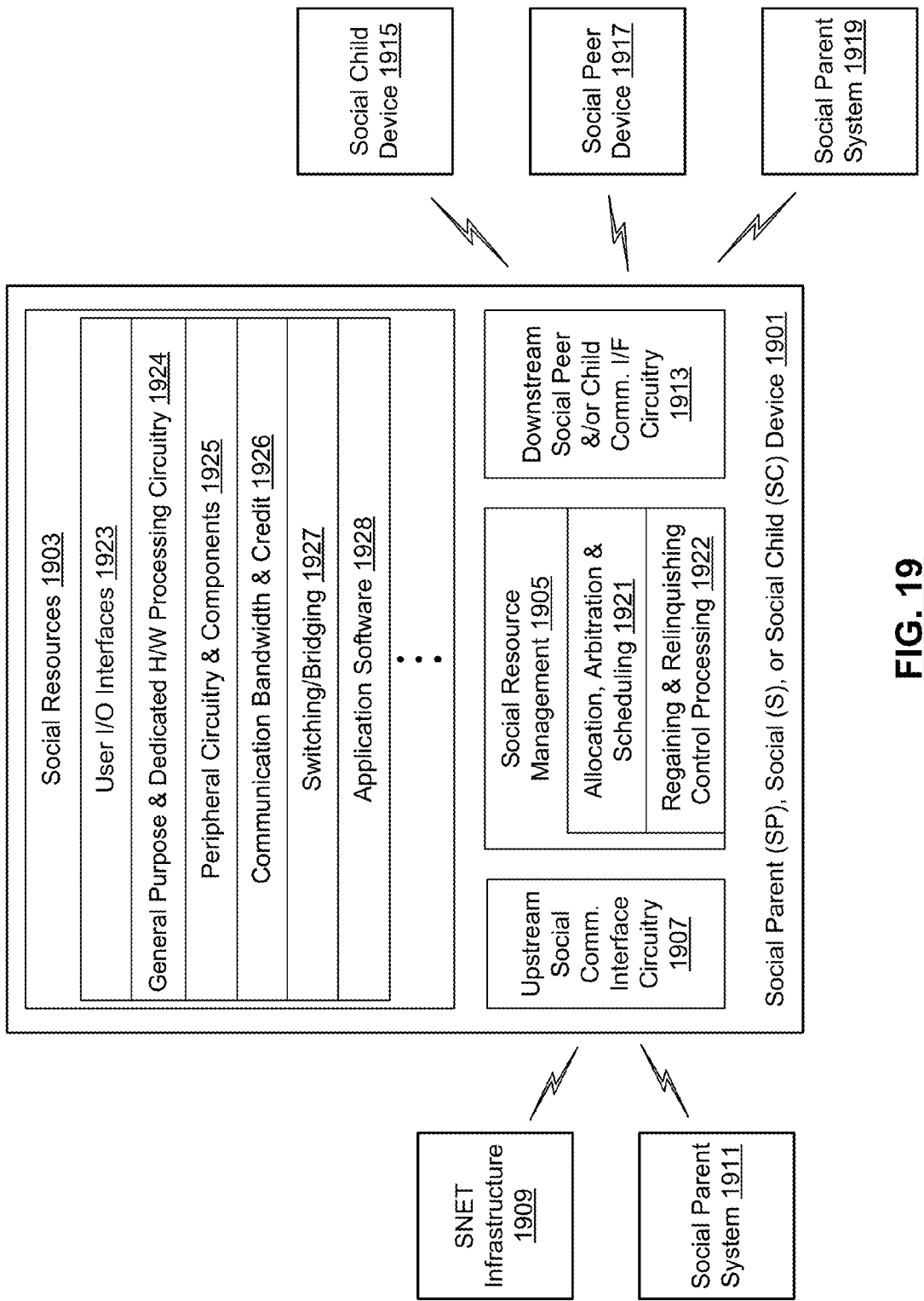

FIG. 18 is a schematic block diagram of an embodiment of a social device or server comprising functionality operable to support social network circle/sub-circle membership and communications in accordance with the disclosure;

FIG. 19 is a schematic block diagram illustrating a social device operable to support various interactions between other social devices and social systems in accordance with embodiments of the present disclosure;

DETAILED DESCRIPTION OF THE INVENTION

In various embodiments described herein, a social network (SNET) includes multiple different types of members including, but not limited to, devices, humans, groups, businesses, software applications, services, and other social networks. The SNET is divided into one or more circles, sometimes referred to herein as rings, each of which can have its own level of security and trust. The security of each level can be implemented by using separate security secrets, for example public or private keys, for communication between SNET members.

In addition to implementing rings of security or trust, adaptive trust levels can be implemented on an individual member or ring basis to permit SNET members to evaluate the likelihood that other SNET members have been authenticated, and to help assess the likelihood that another SNET member will provide an advertised service at a level of quality advertised, and to generally determine whether or not a particular SNET member can be trusted or relied upon. Generally, although not always, members having similar levels of trust with respect to authentication can be included in the same circle or ring, thereby allowing other members of the same circle or ring to rely on circle membership as a proxy for an authentication trust level. In some such embodiments, members of a particular circle may have common, or similar, levels of trust with regards to authentication, and different levels of trust with respect to advertised services, information accuracy, or the like.

SNET members, including devices and services, can belong to more than one circle, and may be a member of multiple SNETs. To facilitate secure communications within and between the different circles and SNETs to which a single device belongs, the device can store different keys for each of the circles in separate, restricted portions of memory.

Before being allowed to become a member of a circle, the potential member can be subjected to third party trust verification. A requirement for multiple current circle members to vouch for the prospective member can also be imposed as a condition of membership. When a member leaves a circle, new keys can be generated and distributed to the remaining members, along with other information related to circle security, such as blacklists, whitelists, algorithm selection information, content restrictions, and the like.

When transmitting content between circles, circle-level authorization and individual-level authorization can be checked to determine if members of the circle to which the content being sent are authorized to receive the content. A check can also be made to determine if the member attempting to transmit the content is authorized to do so. The SNET authorization check can be used to supplement, or possibly replace, other digital rights management (DRM) or content protection processes. Depending on whether or not the transfer of content is authorized, the content transmitted between circles can be tagged, altered, transcoded, or otherwise protected.

Additionally, each circle member can have one or more trust levels associated with it, and one or more of those trust levels can be an adaptive trust level that varies over time based on various factors such as previous interactions with other SNET members, interactions with trusted third party sources, the passage of time since a previous authentication procedure, or the like.

As used herein, the terms "social network" and "SNET" comprise a grouping or social structure of devices and/or individuals, as well as connections, links and interdependencies between such devices and/or individuals. Members or actors (including devices) within or affiliated with an SNET may be referred to herein as "nodes", "social devices", "SNET members", "SNET devices", "user devices" and/or "modules". In addition, the terms "SNET circle", "SNET group" and "SNET sub-circle" generally denote an SNET that comprises SNET devices and, as contextually appropriate, human SNET members and personal area networks ("PAN"). As used herein, the term "digital rights management" (DRM) is intended to be interpreted to encompass various content protection schemes, standards, protocols, and processes by which various types of data are protected from unauthorized copying and access.

The term "trust level" is used to refer to both individual levels of trust, and aggregate or overall levels of trust. For example, an SNET member may have a first level of trust indicating a likelihood that the SNET member is, in fact, who he purports to be. A likelihood that that the SNET member will maintain a promised performance or quality level can be indicated by a second level of trust associated with SNET member, a third level of trust can be used to indicate that the SNET member can provide advertised or promised services, and a fourth level of trust indicating an overall level of trustworthiness. Other types or categories of trust levels can also be implemented according to the teachings set forth herein.

The concept of trust can be illustrated by a participant in a gaming SNET circle, where the participant claims that he is rated as a "CLASS 1" player in a warfare game, has played a threshold number of rounds of a role-playing game, or has participated in crafting particular items in other games. If the participant's claims are true, he may be granted access to particular gaming scenarios, game enclaves, levels, chat groups, or the like. But the special access provides an incentive for the participant to provide false information. As can be seen by this example, even if the participant has been authenticated (one form of trust), he may not be providing truthful information (another form of trust).

Figure 1:
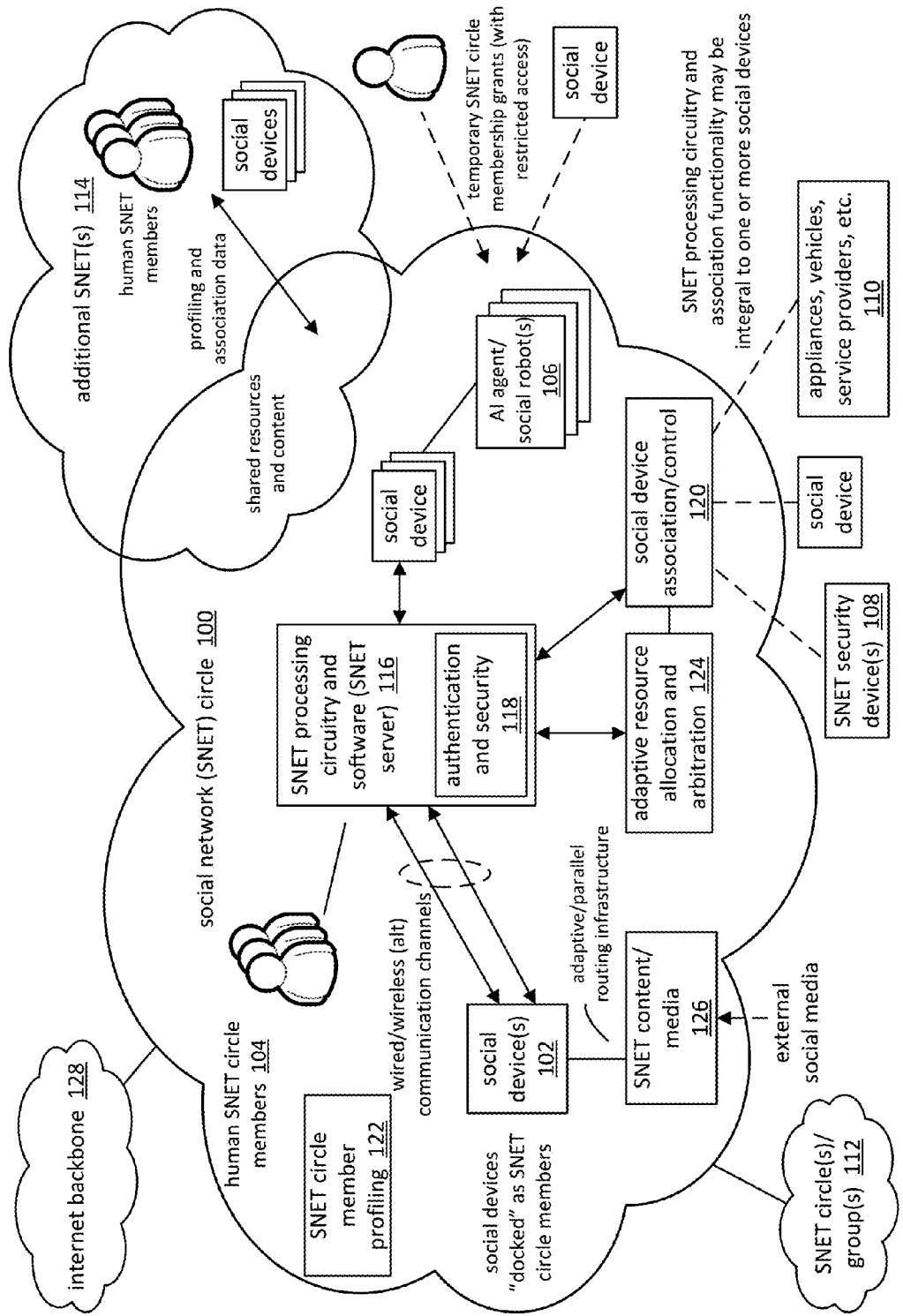
FIG. 1 illustrates a social network circle comprising social devices in accordance with various embodiments of the disclosure.

Referring now to FIG. 1, a social network circle/group 100 (hereinafter "SNET circle") comprising social devices 102 is shown. Beyond traditional social networking features and services, a SNET circle 100 and associated social devices 102 according to various embodiments of the invention include numerous novel features and attributes as described more fully below with general reference to the illustrations.

Briefly, membership in the SNET circle 100 may comprise docked social devices 102 (an embodiment of which is described in conjunction with FIG. 7) and human SNET circle members 104, as well as proxies thereof. Further, SNET circle 100 nodes may include device services and software (e.g., applications) of various types participating as members. By way of example, SNET circle members might include artificial intelligence agents/social robots 106, SNET security device(s) 108, appliances, vehicles and service providers 110, common or authorized members/functionality of other SNET circles 112, etc. Further, access to specific content and resources of a SNET circle 100 may be shared with members of additional SNET(s) 114, including remote or web-based applications. Such access can be conditioned on acceptable profiling and association data. Similarly, social devices or individuals may be granted temporary or ad hoc memberships, with or without restricted access, and in some cases based on one or more levels of trust.

In the illustrated embodiment, formation, maintenance and operation of SNET circle 100 is performed by standalone or distributed SNET processing circuitry and software 116. It is noted that the "SNET processing circuitry" may comprise hardware, software, applications, or various combinations thereof, and be configurable to support various functionalities disclosed herein. Further, the SNET processing circuitry 116 may be included in a standalone server, server farm, cloud-based resources, and/or the various types of devices described below, and incorporate authentication and security functionality 118, including various embodiments that incorporate device security and trust functionality as illustrated and described in the following figures and accompanying description. In addition, specialized middleware may also be utilized by SNETs according to the invention, including standardized middleware with an associated certification process. Interactions and interdependencies within the SNET circle 100 may involve one or more of a social device association/control module 120, SNET circle member profiling module 122, and an adaptive resource allocation and arbitration module 124 as described more fully below.

Distribution of internal and external SNET content/media 126 can be accomplished in a variety of ways in accordance with various embodiments of the invention. For example, media distribution may involve an adaptive or parallel network routing infrastructure involving a wide variety of communication protocols and wired and/or wireless communications channels. SNET content/media 126 may comprise, for example, various user-driven (advertising) channels, pictures, videos, links, online text, etc. Access to such content, as well as communications with and remote access to social devices 102 of the SNET circle 100, may occur over an Internet backbone 128, cellular communication system, WAN, LAN, etc.

Figure 2:
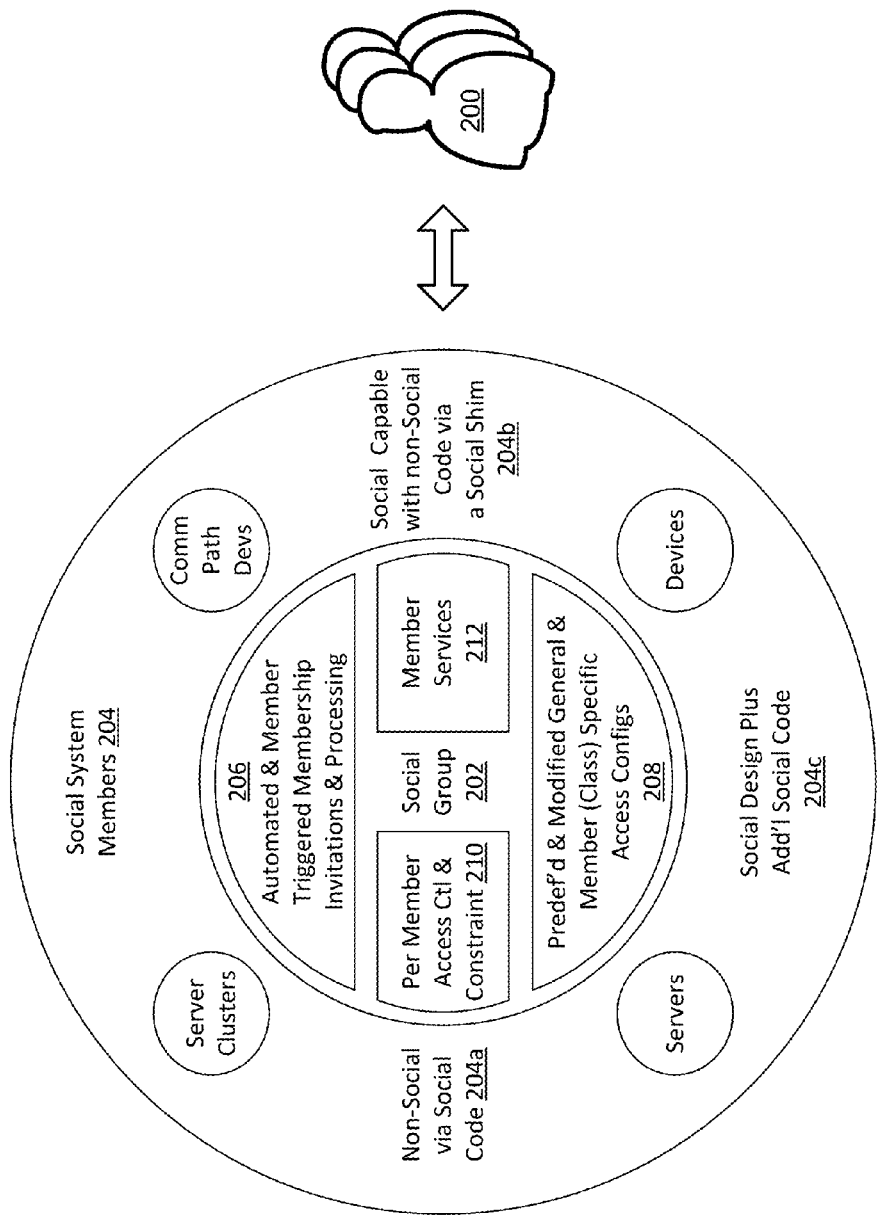
FIG. 2 illustrates a social group and associated devices and services in accordance with various embodiments of the disclosure.

FIG. 2 illustrates a social group 202 comprising a variety of members in accordance with the present invention. Membership in the social group 202 can include a variety of novel social system members 204 functioning in various capacities within the social group 202. As will be understood, certain of the social system members 204 may support direct or indirect associations between the social group 202 and human members/non-members and users 200.

In the illustrated embodiment, social system members (or nodes) 204 include one or more local or remote servers and server clusters that provide a support infrastructure for social group functionality and member operations (routing, data storage, services, etc.). Communications within the social group and with non-members may occur via dedicated or multi-function communication path devices.

Social system members 204 further include devices configured to operate as nodes within the social group 202. Social functionality in such devices and other social system members 204 can be implemented through various means. For example, a device may have integral hardware/firmware/software to support social group access and member operations. Alternatively, a general purpose device 204a may include social code that enables participation in the social group 202. In a further embodiment, a device 204b designed to include social functionality may participate in the social group 202 through a combination of non-social code and a social shim layer or driver wrapper. In yet another embodiment, a member device 204c having a social design may utilize additional social code, including code specific to a social group 202.

Participation in the social group 202 is supported through functionality that includes automated and member-triggered membership invitations and processing (membership management) 206. More particularly, membership management 206 may function to invite prospective members to participate in the social group 202 through automatic, automated and member-triggered processes. For example, membership management 206 might be configured by a human user 200 to establish a social group 202 by automatically inviting/accepting social system members having certain characteristics (such as devices owned or controlled by the user or acquaintances of the user).

Processing of accepted invitations and unsolicited requests to join the social group 202 may be conditioned upon input or authorization from an existing social system member(s) 204 or human user(s) 200 (e.g., through a user interface), and may be further conditioned on one or more trust variables or thresholds in addition to authorization. Similarly, membership management 206 may be configured to generate automated suggestions regarding which prospective members receive an invitation.

Access to and visibility of resources of a social group 202, including services and data, may be managed through general and member class-specific access configurations 208, and like requests to join a social group or circle can be conditioned upon one or more trust variables or thresholds. For example, if membership in the social group 202 includes family members and associated devices, a uniform access configuration (or separate device and human configurations) could be applied across the class in an automatic or automated manner.

Membership classes associated with particular trust levels can be implemented, with membership limited to members meeting specified trust criteria, such as a trust threshold or clearance through a specified trusted third party source. In some embodiments, membership in a particular circle or group may be dependent on the prospective member allowing trust monitoring software, e.g. software to detect tampering with data stored in protected memory areas, to be downloaded or run periodically on a member device.

Access control and constraints 210 can also be imposed on a per-member basis. For example, access to certain resources or to the social circle itself can depend on one or more levels of trust associated with a particular member. Thus, a unified level of authorization trust can be applied across the class, while individual members can still be assigned varying levels of trust within the class. In yet other embodiments, a particular class of membership indicates at least a threshold level of trust and access authorization, so that each class member can be assumed by other social devices to have an overall level of trust that falls within a predetermined range of trust levels.

In some embodiments, access restrictions and restraints can also be applied on a function by function basis, or on a resource by resource basis, or otherwise. Thus, for example, certain services may be provided only to requesters having a threshold level of trust, or belonging to circles having threshold levels of trust. In other instances, services may be provided only to devices connected via a chain having a threshold level of trust. Thus, for example, even a very trusted device connected to the social network through a non-trustworthy device may not be allowed access to certain content from another device based on the lack of trustworthiness of one of the devices in the chain which information must be delivered. In other instances, a threshold can be set for both a chain trust rating and individual trust ring.

Furthermore, because levels of trust can change over time, access constraints can be altered over time to conform to changes in a trust level associated with an individual member, a class, device type, or otherwise. Adaptive trust levels are discussed in more detail with reference to later figures.

The social group 202 may offer a wide variety of member services 212, including both internal and external services accessible by social system members 204. By way of example, the social group 202 may offer email or other communication services between full members and/or authorized guest members and visitors. As with other resources of the social group 202, access control and constraints on member services 212 may be applied to individual members or classes of members.

In cases where SNET services are provided by individual SNET members, a trust level can be assigned to the SNET member providing the services. The trust level can be used to inform decisions made by other SNET members regarding whether or not to attempt to obtain services from a particular source. For example, if a storage device has a trust rating, or level, that indicates that the storage device holds pictures accessible to SNET members, and can be trusted to provide those pictures at an advertised quality level about 50% of the time, other SNET devices can use this trust information choose whether or not to use that device for storage.

Figure 3:
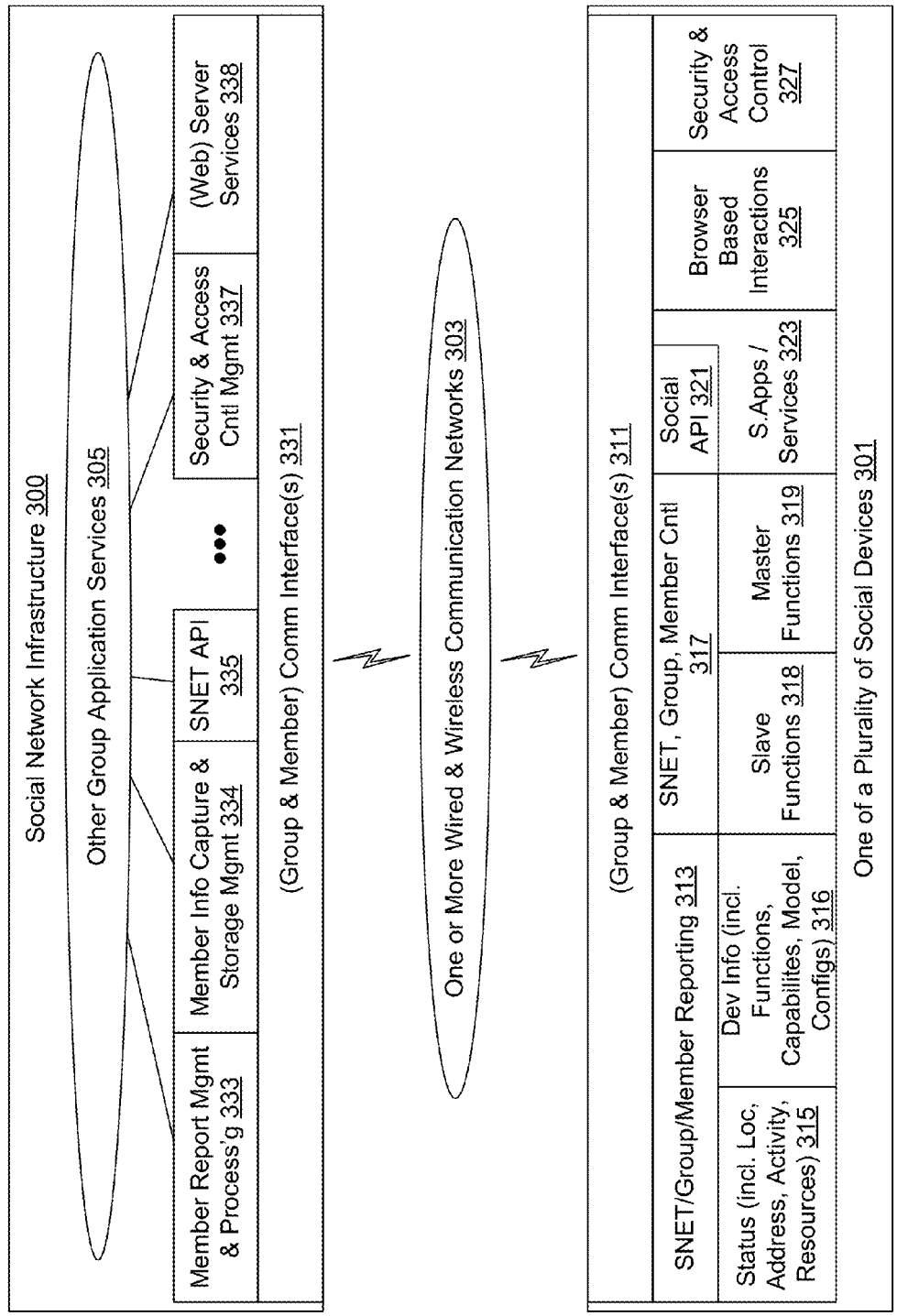
FIG. 3 illustrates a social network infrastructure and a social device communicating according to various embodiments of the disclosure.

FIG. 3 is a functional block diagram illustrating a social network (SNET) infrastructure 300 and (member) social device(s) 301 in accordance with various embodiments of the disclosure. Communications between the social network infrastructure 300, social device(s) 301, and other SNET members may occur over one or more wired and wireless communication networks 303. The SNET infrastructure 300 and social device(s) 301 are coupled to the communication networks 303 by communication interface(s) 331 and 311, respectively, either of which may support communications with individual SNET members or groups/classes of SNET members.

The SNET infrastructure 300 of the illustrated embodiment includes a number of functions and resources to support formation and maintenance of a SNET having social device members. In particular, member report management and processing 333 receives information from SNET/group/member reporting functions 313 in associated social devices 301. Such information may include, for example, status data 315 sent from or on behalf of social device (s) 301. Status data 315 can include information regarding the location, address and activities of a social device 301 or device user, for an authorization level, access permissions, and the like. In addition, social device(s) 301 can provide device information 316 indicating, for example, device functions and social capabilities, device model number(s), device configurations, software versions, attached peripherals and downstream (social) devices, device resources and usage, etc. Device information 316 relating to available resources and current resource usage may be utilized by the SNET infrastructure 300 for purposes of SNET resource management, including dynamic resource allocation and arbitration.

In various embodiments, the social device 301 may have an obligation to gather, store, and report device status information 315 and capability information 316 at different times. For example, reporting may be required upon affiliation or docking with a SNET, on a periodic basis, and/or during operational engagements with other intra- and inter-SNET resources and devices (including upstream and downstream devices). This information gathering and reporting can include trust and authorization levels of both the SNET device itself (parent device), as well as trust and authorization levels of devices used by the parent device to provide advertised services (child devices). In some cases, each device in a chain of parent-child social devices can be required to maintain or report trust or authorization status to the social device immediately upstream from the device in question.

In some embodiments, trust levels affect the obligation of social device 301 to gather, store, and report device status information 315 and capability information 316. For example, if social device 301 has a trust level that falls below a desired threshold, the reporting requirements for social device 301 may be increased in frequency or thoroughness over the reporting requirements for other, more trusted devices.

Referring again to the SNET infrastructure 300, additional functionality and resources include, without limitation: SNET member information capture and storage management 334; an SNET application programming interface (API) 335 that allows SNET associated software components to communicate with each other; security and access control management 337 for maintaining the integrity of the SNET and affiliated data/resources; and (Web) server services 338. The social network infrastructure 300 further comprises other group application services 305 corresponding to the foregoing, as well as additional services such as, for example, firewall or virtual private network services. In one exemplary embodiment, the SNET infrastructure 300 might determine, e.g., by means of device information 316, the category and nature of a social device 301 wishing to participate in a SNET. This determination can include, among other things, either or both of an authorization or trust level associated with the social device 301. As necessary, functionality in the SNET infrastructure 300 could then direct or trigger installation of appropriate application software and underlying drivers in the social device 301. For example, to increase a level of trust associated with a particular social device, software that monitors data or program alterations, or unauthorized access to portions of memory. Such operations might be performed with minimal involvement from inherent functions of the social device 301.

In the illustrated embodiment, the social device 301 comprises a number of additional functions and resources to support participation in a social network. More particularly, SNET, SNET and/or member control functions 317 may include slave functions 318, master functions 319, and various combinations thereof. Slave functions 318 include, for example, device (re-)configuration, directed resource allocation, managed resource arbitration, bridging operations, etc. Master functions 319 enable the social device 301 to establish, manage, and terminate various interactions between nodes or groups of nodes in a social network, including interactions involving the social device 301.

The social device 301 further includes a social API 321 and browser-based interaction capabilities 327 to support, for example, relevant social applications and services 323, which might comprise slave and master functions 318 and 319. Security and access control 325 layers permit the social device 301 to interface with or establish secure SNET groups/circles and control access to internal and external SNET resources.

It is noted that numerous of the functional building blocks of the embodiment of the invention illustrated by FIG. 3 may be incorporated, in whole or part, in one or more application specific or general purpose integrated circuit devices. For example, an integrated circuit device may provide member reporting functionality (including communication of device status and device characteristics), device control capabilities, master/slave functions, security and access control modules, etc. Such an integrated circuit device may also include onboard processing capabilities and/or interface with a processor device. Alternatively, several of the functions described above may be incorporated, in whole or part, into an operating system and/or software loaded above an operating system kernel.

Figure 4:
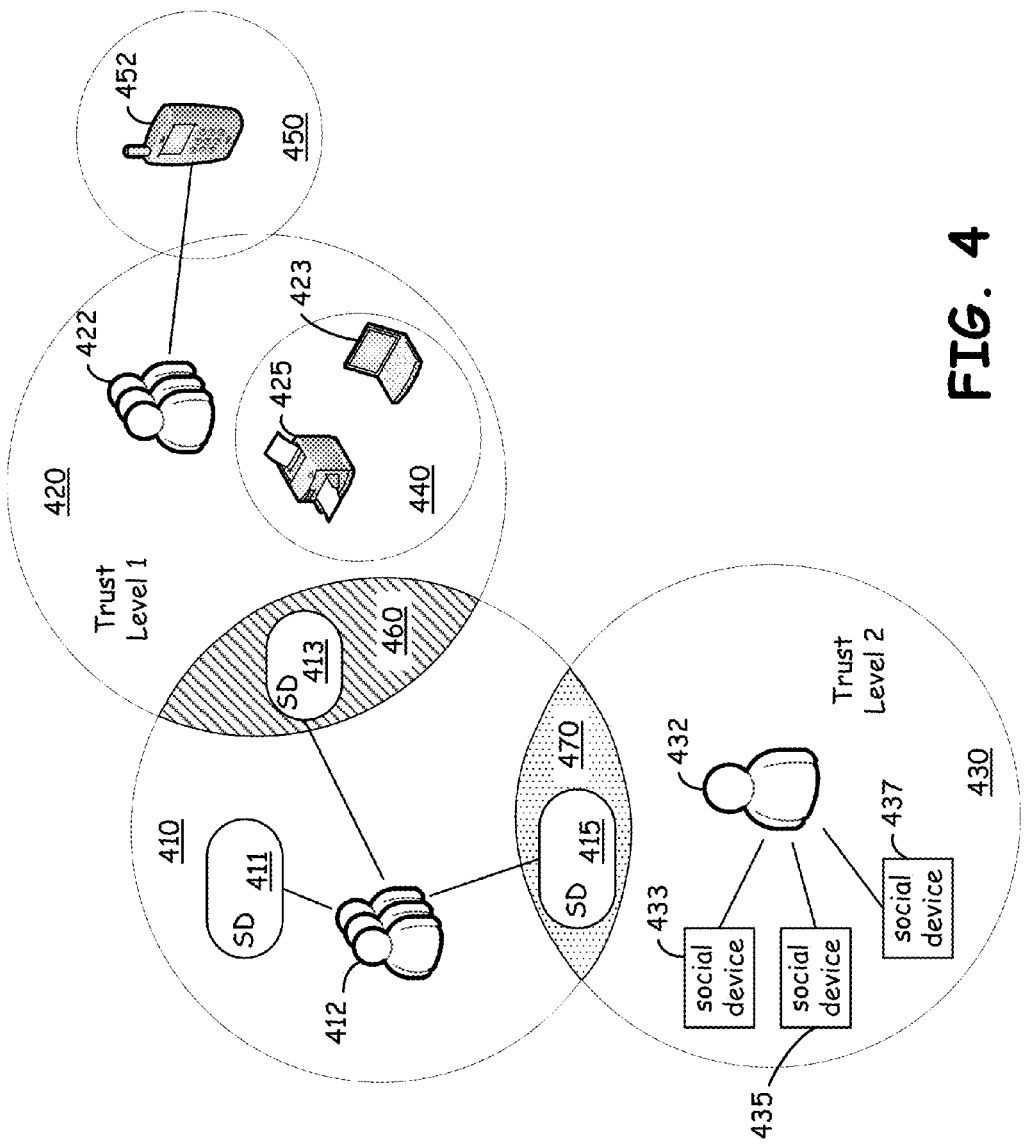
FIG. 4 is a diagram illustrating overlapping social network circles having various trust levels, according to embodiments of the present disclosure.

Referring next to FIG. 4, security among overlapping SNET circles having various trust levels will be discussed according to embodiments of the present disclosure. FIG. 4 illustrates five different SNET circles 410, 420, 430, 440, and 450. SNET circle 450 includes a single device-member, smartphone 452. SNET circle 420 includes human members 422, social device member 413, and circle member 440. Circle member 440, which may also be referred to as a sub-circle of SNET circle 420, includes two device members, printer 425, and laptop 423. Circle 410 includes human members 412, and social devices 411, 413, and 415.

Social device 413 is a member of both SNET 420 and SNET 410. SNET circle 430 includes human member 432 and social devices 433, 435, and 437, which belong to human member 432. Social device 415 is a member of both SNET circle 410 and SNET circle 430. Unless otherwise specified, the term "members," as used with reference to this and other figures, can refer to individuals, devices, or the like, that have been granted temporary or permanent access to content within a particular circle, have been authorized to communicate using relaxed security protocols within the circles of which they are a member, are temporarily docked to a circle, or the like.

Shaded areas 460 and 470 represent overlapping areas between respective SNET circles including shared devices. These areas also represent "demilitarized zones," that allowed devices within them to operate using more relaxed security protocols based on an assumption that any device within the demilitarized zone is a trusted device. In the context of the present example, and in various other implementations, the term trusted device refers to a device member of an SNET that has been granted an appropriate level of authorization. In some embodiments, the term trusted device also refers to a device that has met requirements for at least one trust threshold beyond authentication of identity. For example, if the identify of a device has been verified as discussed herein, the device can be said to authenticated. Thus, an authenticated device can be trusted to be the device it claims to be. Another level of trust can also be used to indicate the likelihood that communications received from the device can be trusted to be sent by the device itself, that the device provides the services it advertises, that advertised services are provided at an acceptable quality, that the device is secure from unauthorized access, or the like. Devices within a demilitarized zone, or within any particular circle, can be trusted with respect to authorization, access, quality of service, "truthfulness," security, and various other aspects consistent with a particular implementation.

Generally, demilitarized zones can be implemented behind firewalls that restrict access from outside of the demilitarized zone, but often essentially ignore communications that do not pass over boundaries of the demilitarized zone. In some instances, all communications within a social network are considered to take place within the demilitarized zone, and a firewall is implemented at the intersection of any two social networks, particularly social networks having different trust levels. An SNET circle including a firewall device can be used as a proxy, and all communications directed towards other SNET circles can be directed through the SNET circle that has the firewall device member. Additionally, firewalls used in conjunction with the techniques disclosed herein can be set up as a default with a circle creation, and/or spawn in an ad-hoc manner.

In addition to using firewalls for information filtering, L2 protocols can be used for creating secure pipes between different SNET circles. Certain implementations employ an (IPSec) VPN, which operates as a DMZ, and allows placing a proxy firewall to manage communications flow into the social VPN. Furthermore, one or more social devices, for example social servers, SNET device members, or the like can serve to bridge communications and verify trust and security between different SNET circles.

Various implementations can also use one SNET circle, whether or not the SNET circle includes a firewall device, as a proxy for communicating with other SNET circles. For example, SNET 420 can serve as a proxy for communications between SNET circle 410 and SNET circle 440. Social device 413, which is a member of both SNET circle 410 and SNET circle 420, is not a member of SNET circle 440, but can communicate with members of SNET circle 440 via SNET circle 420.

In the illustrated embodiment, SNET circles 450 and 410 have indeterminate trust levels, while SNET circle 420 has Trust Level l and SNET circle 430 has a Trust Level 2. SNET 440, by virtue of its being a member of SNET 420 can inherit Trust Level 1. Social device 413, in so far as communications with SNET 420 are concerned, has Trust Level 1. However, human member 412, social device 411 and social device 415 do not likewise inherit Trust Level 1 simply because one member, namely social device 413 has that trust level. In fact, social device 415 can inherit trust level by virtue of its membership in the SNET circle 430, but social device 411 and human member 412 of SNET 410 are not authorized to communicate, or have access to resources in either SNET circle 420 or SNET circle 430.

Various other trust level nomenclatures can be used, and can be implemented on both a per-device basis. For example, social device 413 can be assigned trust levels of "1-30-90" and "?-80%," where "1-30-90" indicates that social device 413 is a member of a circle with a trust level of 1 (SNET circle 420), can only be trusted to provide members of SNET circle 420 with promised services 30% of the time, but when services are provided they are acceptable approximately 90% of the time; and where "?-80%" indicates that social device 413 is a member of a circle with an indeterminate trust level (SNET 410), but can be trusted to provide members of SNET 410 with advertised services at an advertised quality of service at least 80% of the time.

Figure 5:
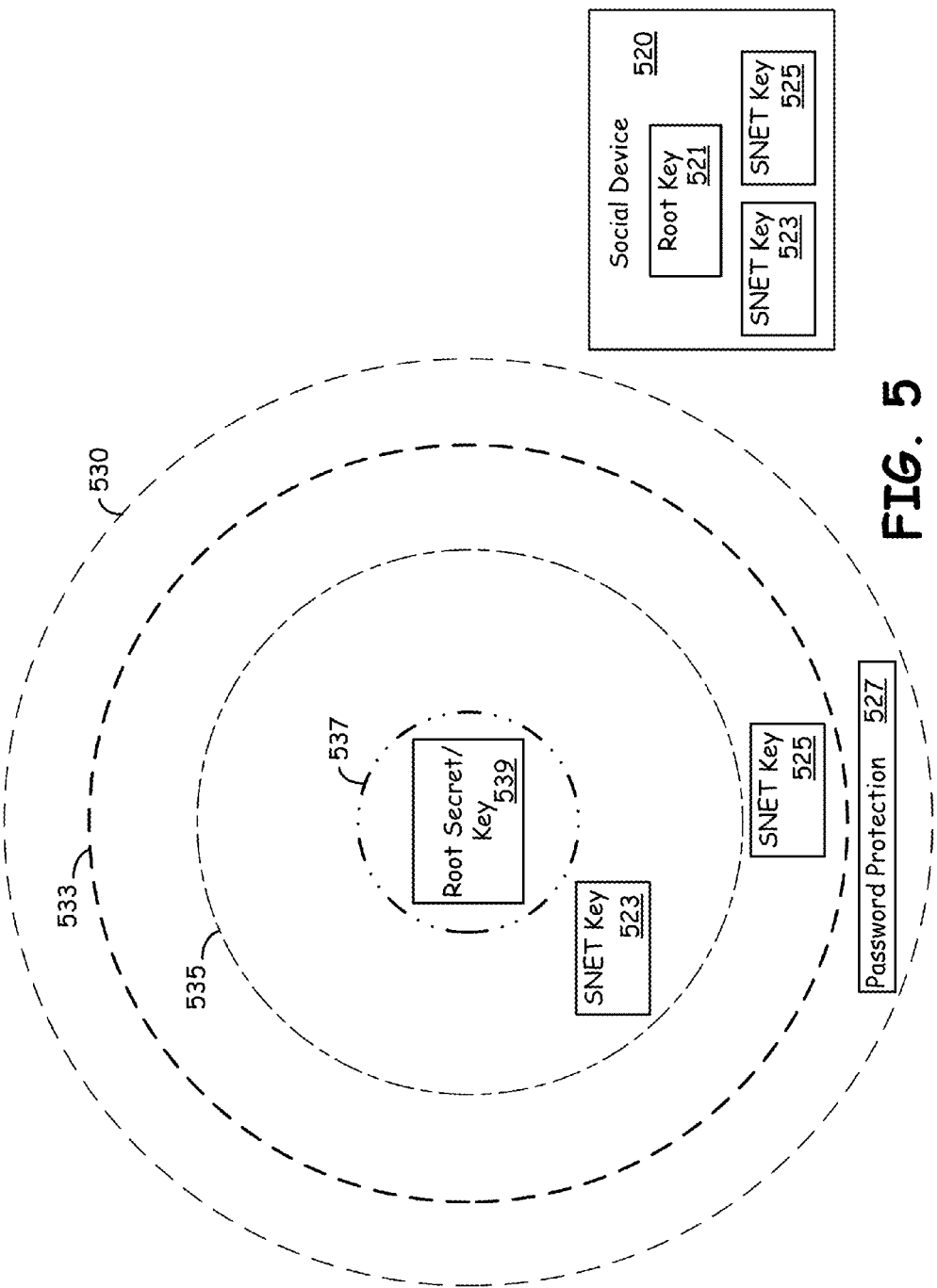
FIG. 5 is a diagram illustrating a relationship between various social circles, or rings, of a social network employing various levels of security, according to embodiments of the present disclosure.

Referring next to FIG. 5, use of different circle secrets, keys, or other circle-specific security is illustrated according to various embodiments of the present disclosure. FIG. 5 illustrates the progression of security from least protected outer ring, or circle, 530 of a social network to a most protected inner ring, or circle, 537. In at least some embodiments, the circle 537 represents a virtual security circle that includes only a social device itself. Circle 537 can be implemented in software or hardware, including being implemented at the chip level, and in general each social device that is connected, docked, or a member of any particular circle can implement its own inner security circle. Sometimes multiple circles can be implemented in a single device, using software for one circle and hardware for another.

The next most protected ring after inner circle 537, which is protected by a root secret 539, is SNET circle. 535 which is protected by an SNET key 523. The next most protected ring is SNET circle 533, which is protected by SNET key 525. The outermost ring, SNET circle 530, employs simple password protection 527.

In effect, members, docked devices, or others can gain access to the resources of SNET circle 530 through use of a shared password. Use of shared passwords can provide adequate security in many instances, particularly if password complexity requirements are imposed. However, in general simple password protection does not provide the same level of security as various shared key, or public-key encryption techniques. Thus, in at least some embodiments, SNET circle 530 is considered to be less secure, then SNET circles 533, 535, at 537, which are protected using security keys.

As illustrated by FIG. 5, social device 520 is a member of some but not all of the SNET circles 530, 533, 535, and 537. For example, social device 520 has access to SNET key 523, thereby allowing social device 520 to communicate with members of social circle 535, because each of the members of social circle 535 also have access to SNET key 523. Likewise, social device 520 has access to SNET key 525, which allows communication with members of SNET circle 533, again because each of the members of SNET circle 533 has access to SNET key 525. In some embodiments a decryption/encryption node (not illustrated) operates within a circle. Alternatively, one or more devices can act as a dedicated decryption engine for a circle.

Social device 520 has a root key 521 that it can use to establish its own SNET circle having itself as its only member. Other members can be invited into the SNET circle, or request admission into the SNET circle, in which case root key 521 can be used to generate other SNET keys (not illustrated), which can be distributed to the requesting potential member, allowing communication at a level determined by social device 520. Likewise, inner circle 537 may include a single device, such as a social device, a server, router, or other network node having a root secret that can be used to generate SNET keys, also referred to herein as circle keys. In some embodiments, multiple devices may each have the same root secret key, thereby allowing each of those devices to be a member of inter-circle 537. The root secret key can be provided by manufacturer, obtained over a secure link, generated based on a common algorithm and using a distributed seed value, or otherwise. Various embodiments employ a one-time programmable (OTP) memory to store root key 521. Note that in some embodiments, multiple levels of keys can be used for communication between members of a single SNET circle. For example, two devices may be communicating using a circle key and an additional key used specifically for communication between two or more specific devices.

In various embodiments, an SNET security configuration including SNET Keys and other information can be loaded from one social device to another, from an SNET host to member devices, or the like. In cases where members are temporarily docked, or where a "permanent" member is removed, the security configuration for an SNET circle can be reloaded into remaining devices, to prevent access by the removed member. In some implementations, a social network hosting site is prevented from having access to information and content transferred within an SNET circle, because the hosting site does not store, or have access to circle keys. Furthermore, various embodiments can be implemented to prevent the host SNET from gaining access to raw data or media content. In some of those cases, the host SNET either acts to mediate an exchange or receives encrypted items without the ability to decrypt those items.

Referring next FIG. 6, a method of generating SNET key, or circle key, is illustrated and discussed according to various embodiments of the present disclosure. Note that although this particular method and technique for generating a circle key is illustrated and discussed in particular, other methods of generating it keys or other secret used in implementing security for social network circles can be used as appropriate. To generate a circle key to be distributed to devices approved for membership in a particular circle, a root key, such as my private key 615, can be encoded using my public key 619 at encoder 609.

As is known by skilled artisans, public/private key encryption techniques work on the assumption that any information encoded by a public key can only be decoded by a corresponding private key. Importantly, the public-key can be used only to encode the message being sent, and once encoded, the public key cannot be used to decode the very message it was used to encode. Thus, if a device encodes its private key using its public key, the public key cannot be used to recover the private key. Thus, because the circle key 617 is an encoded version of the private key which cannot be decoded except using the private key itself, the circle key 617 can be distributed without fear of having the private key discovered.

In some instances, the public-key used to encode the private key is not the public-key belonging to that private key. For instance, a device may have two private keys. A public-key associated with a first private key can be used to encode the second private key. In yet other embodiments, secrets other than public or private keys can be encoded with the public-key to generate the circle key 617.

Once the circle key 617 has been generated, it can be distributed to members of the circle and used as a shared key to encrypt communications between circle members. This technique can be used in conjunction with separately encoded channels between particular devices to provide even further security.

Referring next to FIG. 7, a social network circle 700 including devices connected via a communication network 710 is illustrated and discussed according to various embodiments of the present disclosure. Social network 700 includes a social network member 711 that has access to A/V content either locally or through other social devices, such as social devices 715 and 717. Also included in social networks 700 are DRM module 721, social devices 723 and 725, and transcoder 709 for use in transcoding content being transmitted outside of social networks 700 in accordance with various content protection parameters established by DRM module 721, in accordance with access policies associated with membership in social network circle 700, in accordance with limitations associated with particular content, or some combination thereof.

When a request for content is received from outside of SNET circle 700, a determination can be made regarding whether or not the content is to be delivered. Thus, if social device 723, which is a member of SNET 700 has access to the requested content, social device 723 can send the requested content to DRM module 721 for appropriate encoding in accordance with various digital rights management standards, or otherwise. If DRM module 721 determines that the content is not to be transmitted outside of SNET circle 700, DRM module 721 can instead provide the content to transcoder 709, which can provide a lower quality version of the content in accordance with content correction parameters associated with SNET circle 700. Some embodiments provide for multicasting of content between or within SNET circles.

In some cases, content may not be protected by a DRM scheme, but a member of SNET circle 700 may desire to limit distribution of content outside of SNET circle 700. Thus, for example, SNET member 711 may access locally stored video content or audio video content from either social device 715 or social device 717. The audio video content can be delivered to transcoder 709 which transcode the content as necessary, or in accordance with the security settings or other parameters of SNET circle 700.

Some of the SNET security parameters include, but are not limited to, limiting the ability to consume, use, or access particular content or types of content once or N times, date range limitations, and allowing access only so long as a device remains a circle member. The security features can be implements at a content level, device level, feature or feature level. Other security controls may include verification of a social device, email, telephone number, etc.

When content is authorized for transfer outside of SNET circle 700, the content can be tagged prior to being transmitted. For example, the tag could indicate a number of copies allowed to be made of the content, or a number of times the content can be viewed or accessed. The tag could include an identifier indicating the source of origin of the content, including the circle or specific device that transmitted the content. In some cases, an SNET circle can help enforce content protection schemes by preventing retransmission of the content by verifying with the original SNET circle whether retransmission is allowed to a third SNET circle.

Further security for protected content can be achieved in some implementations provide for the use of selectable levels of DRM protection upon uploading or otherwise making available content to an SNET circle, and by allowing the person uploading the content to select the type of transcoding to be performed by transcoder 709. For instance, a high quality original work can be transcoded to a lower quality format and can be configured to expire after a particular period of time. The uploaded file can then be posted for sharing. The protected file also can be linked to or otherwise identify a high quality source file—e.g., for purchase on a commercial site. That way an artist can advertise through sharing and sell through a different outlet, such as iTunes.

Figure 8:
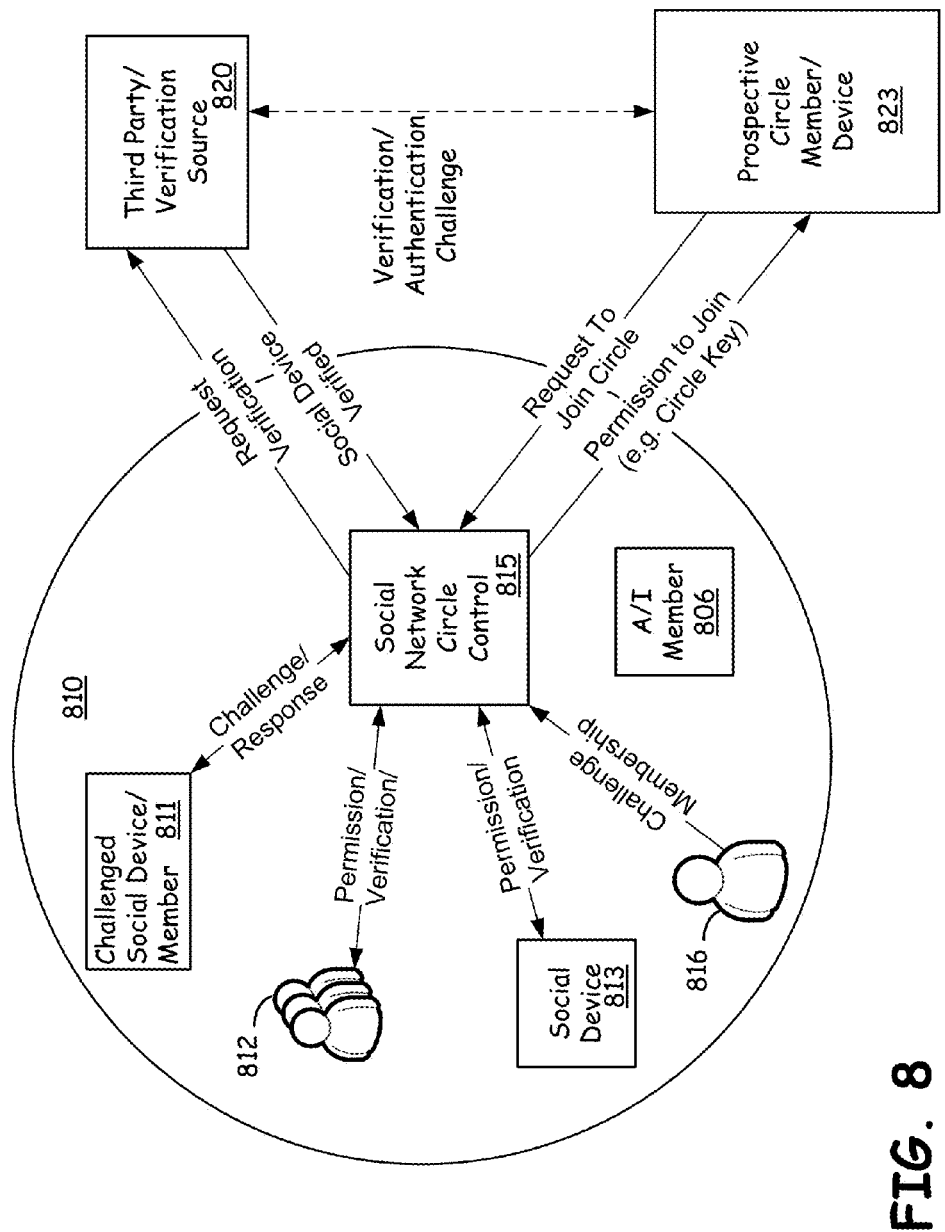
FIG. 8 is a diagram illustrating various techniques used to authenticate membership and verify trust in the context of a social network circle according to embodiments of the present disclosure.

Referring next FIG. 8, security techniques associated with approving circle memberships are illustrated and discussed according to various embodiments of the present disclosure. Many of these same techniques can be employed in establishing and maintaining one or more trust levels associated with various social devices. SNET circle 810 includes social device member 811, human members 812, social device member 813, human member 816, and a social network circle controller 815. Social network circle controller 815 can be implemented in a centralized server hosting the social network of which social network circle 810 is a part, in one of the member devices of social network 810, in a cloud hosting environment, using decentralized networking methods, or various combinations of these. An example of a social network circle controller and associated infrastructure has been previously discussed generally in conjunction with FIGS. 2 and 3 of the present disclosure.

FIG. 8 illustrates an authorization or trust verification process. Although many of the authorization concepts discussed here can be also be applied to establishing or maintaining trust, the discussion of FIG. 8 deals primarily with authorization. Various ways of establishing trust levels in conjunction with the authorization process will be discussed subsequently.

The embodiment illustrated in FIG. 8 shows perspective circle member 823 sending a request to social network circle controller 815 to join SNET circle 810, although the principles discussed here apply equally to situations in which social network circle control 815 initiates the membership process. In response the request to join SNET circle 810, social network circle control 815 can take various actions, depending on the protocol established for membership verification in SNET circle 810. For example, in response to receiving a request to join the circle social network circle controller 815 can request verification from a third-party source 820, such as a certification trust authority. In response to receiving the verification, Social Network Circle controller 815 can respond to perspective circle member 823 with a message indicating permission to join SNET circle 810 has been granted. This communication may include, for example a circle key, and other information associated with SNET circle 810 such as a list of current members in various protocols, parameters, preferences, restrictions, and the like.

In some embodiments, in response to receiving a request to join SNET circle 810, social network circle controller 815 can send a verification or authorization request to one or more current members of SNET circle 810. So, for example, when perspective circle member 823 requests to join SNET circle 810, SNET circle controller 815 can send requests to human members 812 and to social device 813 asking that those members vouch for, or otherwise give permission, for perspective circle member 823 to join SNET circle 810.

In some cases the response from either social device 813 or human members 812 can include a simple yes/no, while other embodiments employ responses including additional information. In some instances the response can include a challenge request, such as a question to which the answer would presumably be known only by the perspective circle member 823, or some other verification question. In other implementations, social network circle controller 815 can seek verification from third-party verification source 820, in addition to asking one or more members of SNET circle 810 to vouch for a perspective member, before providing the perspective member with the circle key, or other circle secret that can be used to facilitate or enable communications with other members of SNET circle 810.

Social network circle controller 815 can also be adapted to provide additional security related to individuals, devices, or other entities that have already been granted membership access to SNET circle 810. For example, if a member 816 believes that social device 811 may have been improperly granted membership in SNET circle 810, member 816 can send a challenge to social device 811, successful completion of which will verify that social device 811 has been properly included as a member in SNET circle 810. As illustrated in FIG. 8, member 816 can send the membership challenge to social network circle controller 815, which in turn initiates the challenge-response process used to verify that membership has been properly granted to social device 811. The challenge, like the initial membership request, can be handled by sending a verification request to a third-party verification source 820, sending request for other members to vouch for and verify social device 811, or various combinations thereof.

In other embodiments, the challenge can be sent directly from member 816 to the challenge social device 811. Additionally, challenges from a threshold number of different members of SNET circle 810 can result in temporary blacklisting of a device or other member until that device or member can be authenticated, or have its trust level confirmed. Various embodiments can also be adapted so that a challenging member, such as member 816 can be required to himself pass an authentication, trust check, or verification before issuing the challenge, thereby making it more difficult to prevent attacks by devices or other members that may have been inadvertently admitted as members to SNET circle 810, been permitted to temporarily dock with SNET circle 810, or that have otherwise gained access in desired to maliciously attack one or more members of SNET circle 810.

If a member is removed, for example, for failing to properly respond to a challenge issued by another member, lack of communication with any other member of SNET circle 810 for a threshold period of time, for exceeding a threshold number of authentication attempts, for having its trust level drop below a threshold, or for some other reason, social network circle controller 815 can regenerate the circle keys, and send new circle keys or other security information to the remaining members of SNET circle 810, but not to the device that is being removed.

In implementing verification procedures for SNET circle membership, second pathway authentication can be used. Second pathway authentication is not limited to the above examples, and can include using one social device, e.g. a phone, to authenticate interactions based on activity taking place via a different social device. For example, for particularly sensitive functions such as adding a device or another human to SNET circle membership, a second path authentication/authorization request can be sent. Once completed, all further transactions, even those that are sensitive, may occur without such secondary path authentication for a period of time (configurable).

Additionally, in some embodiments an artificial intelligence (A/I) member 806 can be used to identify suspicious activity within an SNET circle. A/I member 806 monitors activity, records a log of the monitored activity, identifies unusual activity, triggers authentication challenges, and contacts underlying members and devices of interest putting them on notice. Because typical infiltrating users and devices will exhibit unusual behavior which can be detected, A/I member 806 can improve SNET circle security.

Referring next to FIG. 9 various adaptive levels of trust between different members and member types of social network are illustrated. The term "trust" includes authentication, which is a type of trust related to identity, and other types or categories of trust, for example categories of trust related to truthfulness of information presented or promised. For example, a trusted social device can be considered trusted as to identity if it is likely that the device is, in fact, the device it purports to be. That same device may not be trusted to keep information it receives confidential, and trusted to a middling degree to provide the service it purports to provide with an advertised quality of service.

For example, if a device member is a mass storage device and advertises that it will provide a certain amount of mass storage at a particular level of service, the level of trust associated with the mass storage device can be used to make decisions about whether the device actually does provide the amount of mass storage and at the quality of service indicated. Thus, a trust rating of 50%, for example, might indicate that although the mass storage device advertises a particular level of storage at a particular level of quality, there is only a 50% chance that the device will meet its advertised storage and quality levels. In other embodiments, trust ratings can be assigned for individual quality types or categories. For example, one trust level can be assigned to a device to indicate an ability to deliver stored content at a particular speed, while another trust level can be assigned to indicate a percentage of uptime of the device. Other similar quality measurements can be assigned trust levels. In at least some embodiments, the trust rating is based on the actual quality provided, while in others the trust level is based on whether or not an advertised quality level is achieved. Thus, a storage device that provides error-free data 75% of the time, but advertised error free data 99% of the time, would have a lower trust rating than a device that provided error-free data only 70% of the time but promised error-free data only 65% of the time.

An SNET member can be assigned multiple trust levels associated with different trust categories. Each trust level can, but need not be, independent of other trust levels assigned to other categories. Additionally, an SNET member can be assigned an overall level of trust that can, but need not be, a weighted average of other trust levels assigned to individual trust types or categories. Furthermore, one or more of the trust categories can be adaptive, changing over time based on various different factors such as interactions with other SNET members, a history of truthfulness, verification by trusted sources, and the like. Additionally, when determining whether communications with a trusted social device can be trusted, the trust level of other devices in a chain of devices used to communicate with the target device can be taken into account, and the entire chain of devices can be assigned one or more trust levels.

Still referring to FIG. 9, Social network infrastructure 901, one example of which has been previously discussed with reference to FIG. 3, includes trust management storage unit 903. Trust management storage 903 can be used to facilitate determining whether members of an SNET are trusted, and to what extent those members are trusted. In the context of an SNET, trust can include determining a likelihood that a device or person is who they purport to be, determining a likelihood that a device offers the services which it purports to offer, and determining a likelihood that any particular communication or piece of information received from an SNET member is trustworthy. The same or similar concepts discussed with respect to trust of individual SNET members can also be applied to a chain of members, and to circles of SNET members.

Adaptive trust levels can be understood by referring to human member 917*a*, which represents a trust level of a human member upon initially joining an SNET, and 917*b*, which illustrates an updated trust level at a later time. At the time human member 917 is granted membership by social network infrastructure 901, he can be assigned a trust level of zero (0%), because social network infrastructure 901 has no reason to trust human member 917.

According to some aspects of the present disclosure, one or more levels of trust associated with any particular member, can be bolstered based on communications with other members, a recorded transaction history, a history of trust with other members or with the social network in general, a history of trust with particular devices, or through a third party trust authority. Bolstering can be performed to update the trust level currently assigned to member in response to a request by a member's itself, or in response to a request from an entity other than the member being bolstered. Social network infrastructure 901 can also initiate a bolstering process as part of an SNET maintenance or security plan.

Bolstering can include contacting a trust authority 908, which in various embodiments includes non-member persons such as a notary public who can vouch for the identity of human member 917, a law enforcement official such as a department of public safety officer who can verify drivers license information, a local, city, state or federal official who can compare a birth certificate produced by human member 917 with a drivers license or other form of identification, a credit verification Bureau, or similar individuals or entities. In some implementations, contacting trust authority 908 is used in conjunction with trusted member system 909, which can solicit or receive unsolicited information from other members of the SNET regarding the trustworthiness of human member 917. As illustrated in FIG. 9, the trust rating of human 917 can be bolstered from zero (0%) at a 117*a*, to 80 (80%) at 917*b* through the use of trust authorities 907 and through communication with a trusted member system 909, which can store transaction histories for individual members and chains, trust feedback related to transactions with various SNET members, a history of trust levels associated with particular devices, or the like.

FIG. 9 also illustrates the concept of parent/child relationships within an SNET, as well as chains of trust. For example, human 917 cannot communicate with social network infrastructure 901, except through a device, such as parent device 925. Thus human member 907 can be considered to be a child member of parent device 925. Likewise, human member 931 is a child of parent device 915, and child device 907 is a child of parent device 905. Each parent member is said to be upstream from its child, and although not specifically illustrated, in longer chains a child device can itself be a parent device.

As shown in the illustrated embodiment, each parent device has a trust level, and each child has a trust level, which can be different from each other. But because communications to child members must pass first through the child's parent, and because the trust levels assigned to a child may be higher than the trust level assigned to a parent device, some embodiments also assign a level of trust to the chain between social network infrastructure 901 and a target device. For example, parent device 905 may have a trust level of 80%, whereas child device 907 may have a trust level of 65%. In this case the chain of trust runs from social network infrastructure 901, through parent device 905, to child device 907. In another example of a chain of trust, human member 931 is assigned a trust level of 95%, parent device 915, is assigned a trust level of only 5%. The chain of trust in this instance runs from social network infrastructure 901, through parent device 915, to human member 931.

The trust level assigned to a chain can be associated with the entire chain, or with only a portion of the chain requiring access. For example when accessing parent device 905, which has an 80% level of trust, the level of trust associated with child device 907 may not be important, and thus will not be taken into account in determining the level of trust associated with a chain. In a contrasting example, child device 907 has a trust level of 65%, and so the trust level assigned to a chain that involves communication with child device 907 might be limited to 65%. In some embodiments, however, determining the level of trust of a chain includes calculating or estimating a statistical probability that includes the trust levels of each device in the chain, so a trust level assigned to the chain including parent device 905 and child device 907 could be, for example, $Trust_{chain}=Trust_{parent}*Trust_{child}$, which in this example yields $Trust_{chain}=0.8*0.65$, or $Trust_{chain}=0.52$. Other suitable methods of calculating the trust level of a chain are within the scope of the present disclosure.

In various embodiments, the maximum value of the trust level assigned to a chain may not be limited by the lowest value of the trust in the member of the chain. Furthermore, one SNET member can, in some circumstances, bolster the level of trust assigned to another SNET member. Consider, for example, a human SNET member who uses many different devices to communicate with the social network. If a history associated with the human SNET member indicates that the human SNET member uses multiple different devices to access the SNET, even if those devices have a low trust level themselves, the information coming from the human SNET member can have a high level of trustworthiness. In some such circumstances, the level of trust assigned to information received via a chain that includes the human SNET member can be assigned a trust level that greater than the trust level assigned to the chain as a whole. The maximum level of trust that can be assigned without a third-party trust verification can be limited to prevent individuals or devices from acting in a trustworthy manner under pretext, for a short period of time, with the intention of later infiltrating the social network.

Referring next to FIG. 10, the concepts of trust and trust chain links are discussed with reference to social network infrastructure 1001. Social network infrastructure 1001 includes initial account setup & trust processing module 1003, and various resources used to implement trust rules, control access to, and otherwise facilitate functioning of social group 1031. The resources include invitations and trust module 1033, trust chain module 1039, per-member access module 1037, and access configurations module 1035. Social network infrastructure 1001 is connected via a communications link with trust authority 1007, which itself is in communication with trust authority 1009, and trusted system 1023. Trust authority 1007, trust authority 1009, and trusted system 1023 cooperate with each other to establish, verify, and adjust one or more trust levels associated with SNET members, such as human member 1010, device 1005, and child device 1021, SNET circles, SNET chains, and the like. The various trust authorities and trusted systems can also be used to verify the trustworthiness of other trust authorities and systems, regardless of membership in a particular SNET or SNET circle.

Also illustrated in FIG. 10 are trust chain links A-D. Trust chain link A illustrates a trust link from a pre-established trust relationship between human member 1010 and trust authority 1009, for example a birth certificate. Using either a direct communication or via an intermediate document, e.g. the birth certificate, human member 1010 can extend the trust chain via another trust authority 1007, e.g., passport, driver's license service). This can be achieved through an electronic communications link, such as a wireless link, via staff to staff communication between trust authority 1007 and trust authority 1009, or both, plus interaction with human member 1010 or a trusted document 1011, for example a driver's license, passport, etc.

Visual and description information, including age, gender, weight, height, address, social security numbers, "freshness" date, or the like, can also be delivered from trust authority 1007 to trust authority 1009. This information can receive another layer via the trusted authority 1007 as it interacts with human member 1010, either providing "fresh" confirmation or adding a superseding entry. Other sources can also be used to verify each of the elements of information transmitted between trust authority 1007 and trust authority 1009.

After interacting with trust authority 1009 and human member 1010, trust authority 1007 establishes a trust rating for human member 1010, which indicates whether or not any information given seems in conflict or unusual. For example, a trust rating of 80% may be given to human member 1010, indicating that there is an 80% probability that the associated trust information is correct.

Specific resolution regarding why the rating is not higher or lower, may be tied to trust ratings of specific pieces of information used to establish the overall trust level. For example, a passport with visual face recognition correlation with human staff confirmation that the person present plus the passport photo are likely the same person might yield an 85% confidence level that the person is who they say they are. A comparison of hospital recorded biometric information obtained at the time human member 1010 was born, for example an iris print, fingerprint, or other information, with corresponding information obtained at the present time from human member 1010 might yield a much higher confidence level, for example 95%. The missing 5% might involve elements further up the chain, e.g., the trust link associated with the hospital and its staff.

Once human member 1010 becomes trusted, for example through the interactions just described, he may attempt to interact with social network infrastructure 1001 through device 1005 to establish an account via initial account setup & trust processing module 1003. Note that the communication links illustrated between various devices can include one or more wired or wireless communication networks or links along with any needed bridging, routing and access nodes between those devices.

When setting up the account, human member 1010 can provide information identifying himself and other associated information. From such information, initial account setup & trust processing module 1003 interacts with the trust authority 1007, either at the same time or post facto, to gather trust information and ratings of 1007. These ratings can be used by initial account setup & trust processing module 1003 to establish its own trust ratings, and construct challenge questions that will be used to challenge human member 1010 via device 1005. Overall, from such queried interactions, information received from trust authority 1007, information received directly from human member 1010 via device 1005, and received trust ratings, new trust information and updates can be generated and stored in one or more of trust chain database 1039, access control 1037, invitations and trust 1033, and access configuration 1035. The trust ratings, updates, and other information can also be communicated in whole or in part back to trust authority 1007 for storage or distribution to other storage locations.

Note that in various instances, when generating adaptive trust ratings, newer data may be overlaid onto the older data without producing or replacing the older data, at least to an extent permitted by storage. Overlaying the data permits newer data and older data to be taken into account, given different weightings based on currency of the information, and allows an overall trust rating to settle at a particular level over time.

At this point, human member 1010 has established a trust rating and trust relationship with social network infrastructure 1001, but device 1005 is not yet trusted. This can be problematic in some instances, because account information received from device 1005 could have been provided by an imposter posing as human member 1010. Some embodiments, therefore, fully confirm the account information via interactions between human member 1010 and a trusted device, trusted person or both, for example via trust link B. This might involve human member 1010 going back to the trust authority 1007 or to another location where a trusted device is available, and through which a trust relationship can be confirmed through interaction between initial account setup & trust processing module 1003 and human member 1010 via a trusted interface. Such trusted information can also be further layered in via storage in social network infrastructure 1001 and trust authority 1007. Likewise, other trust authorities could be used by human member 1010 to buttress his trust level. For example, trust authority 1009 could directly interact with trust authority 1007 for further confirmation, or to gather further trust information, e.g., "What was your mother's maiden name and where were you born?" which might not be available from trust authority 1007.

In various embodiments, once human member 1010 is established as a trusted member, he can confer trust to one or more of his "parent" devices, such as the device 1005. Device 1005 is referred to as a parent of human member 1010, because communications between social network infrastructure 1001 and human member 1010 pass through device 1005. Conferring trust from human member 1010 to device 1005 establishes another link in the trust chain, illustrated as trust link C. One way for human member 1010 to confer trust to device 1005 is by downloading one or more trusted software applications from initial account setup & trust processing module 1003 onto device 1005.

The downloaded software could analyze the device 1005 for malware, security level capabilities, tampering indications, and identify of any trust servicing components such as cameras, fingerprint readers, or other biometric systems, and the like. In many instances biometrics can play an important role in verifying and maintaining trust with a device connected to a social network. For example, constant or periodic challenges and checks using biometrics, if included in a device, can allow the device to maintain a higher trust level than devices not having such biometric input.

The software can, in some embodiments, remove malware or suggest a way to repair problems via other third party software. The software can also report security threats, tampering, etc. to human member 1010 or Social network infrastructure 1001. After it has been established that device 1005 is clear of malware or other security threats, a trust level can established for the device. In some implementations, even if malware existed, device 1005 can be granted membership, but the trust level could reflect the presence of malware, and device 1005 could be red-flagged.

Once device 1005 becomes a member of the SNET, chain of trust link C can be established between human member 1010 and device 1005, now the trusted parent member 1001. In some embodiments, after device 1005 becomes a member of the SNET associated with social network infrastructure 1001, device 1005 can deliver capability, social services, control, configuration, status, etc., information to initial account setup & trust processing module 1003. Such information might indicate that 1005 is capable of servicing child human members, child device members, or only operate as a standalone device. In addition and likely in response, initial account setup & trust processing module 1003 delivers social operating program code (if not pre-loaded by the manufacturer) in the form of drivers, API's, Apps, and associated data for future use by device 1005. All of such information, along with trust information can be stored by various elements of social network infrastructure 1001. Thereafter, periodically, upon device 1005 logging in to the SNET, or otherwise, such information can be used to challenge 1005 and verify the authenticity of 1005 with some degree of trust.

At this point human member 1010 and device 1005 have received trust ratings, which may change over time as interactions and challenges occur. To add child device 1021 as a trusted member human member 1010 and device 1005 can interact to vouch for child 1021's trustworthiness. Alternatively or in addition, 1005 might assist in the process of establishing the chain of trust link D to child device 1021. Both can occur, especially wherein the device is a child device, i.e. a device that interacts with social network infrastructure 1001 only via another device. For example, child device 1021 might be a printer or a television, whereas device 1005 might be a computer or a set-top box (STB). In either case, child device 1021 may operate as a standalone device with an upstream interface to device 1005, and not directly with social network infrastructure 1001.

In such cases, child membership for child device 1021 could be established via device 1005. This can, in some embodiments, involve device 1005 retrieving and delivering to social network infrastructure 1010 information regarding child device 1021, and the link to child device 1021. It can also involve carrying out trust challenges between device 1005 and child device 1021, or between social network infrastructure 1001 and child device 1021, with bridging of such challenges via device 1005. Child device 1005 might also deliver trust program code received from initial account setup and trust processing 1003 or human member 1010, for example apps, drivers, firmware, etc., to child device 1021 to establish and maintain trust levels of child device 1021.

Device 1005 might also assist in helping child device 1021 perform better socially. For example, child device 1021 might not be a social device, but instead be designed to service only a single device 1005. With additional software running on device 1005, for example a social driver received from social network infrastructure 1001, device 1005 and members of a social network associated with social network infrastructure

1001 can gain access to status, controls, interfaces, and services offered by child device 1021. In some cases, child device 1021 can raise its trust level post facto by being taken to or otherwise directly interacting with a trusted device or authority 1023 that has a higher trust rating than that of device 1005. And even if the trust level is not higher, trusted device or authority 1023 can increase the trust level of child device 1021 because an additional, different trust chain E is used.

Similarly, although possibly contributing lesser levels of trust level or rank enhancements, other members (devices or humans) can vouch for any other member, creating another trust chain link and further bolstering the trust level of such trusted member. In various embodiments, even with a zero level of trust rating, all members could participate and thereafter build trust in the variety of ways mentioned above. Whether high or low, each member can be represented within their groups/circles with trust indicators. For example, using the rainbow (frequency sequence), the more trusted the more moving toward purple (and having a mouse over textual rating number such as 80%). The less trusted moving more toward red (for example, no trust being red) and mouse over identifies 0%. Also, based on trust levels, a social group 1031 can place limitations via per member access control and constraints 1037 on access control and other constraints. For example, in one implementation only members with 70% trust levels can gain access to "my home video", while members with 20% trust levels can access third party video stored in a trusted NAS child member device (not shown).

For various device members of an SNET, trust can extend to malware free ratings as well as authentication. In other words, authentication can be extended to cover an authenticated service and service interactions. In other words, if a member is who it says it is, and the member does what it promises to do, the member's ratings go up. This can allow trust levels to can adapt over time, and increase or decrease as services are received or preformed. In some instances, multiple separate trust ratings and indications are used. For example, in a sales/shopping group, a "star rating" may be 5, based on a large number of satisfied member purchasers, an identity/authentication rating, i.e. "I am who I say I am," is quite low, perhaps at 10% while operating a sales portal member server that has no independently established trust beyond that obtained from successful transactions.

In various embodiments, granting membership to device 1005 includes extending social group 1031, and can be accomplished by an icon drag and drop on a representation of social group 1031 displayed on an SNET interface (not illustrated). Once device 1005 is granted membership in social group 1031, human member 1010 can, via device 1005, add himself to a social group 1031, which can in some instances be a particular social circle or sub-group, using a drag and drop procedure. Then, other member humans or devices can be added to social group 1031 in a similar manner. Furthermore, human member 1010 can alter or create a default set of rules establishing the basis for other members (human or devices) adding further members to the social group 1031.

Referring next to FIG. 11, adaptation of a human member to human member chain of trust over time is illustrated and discussed. Human member 1101 is a member of a particular SNET, SNET circle, or the like, and over time interacts with other human members 1111, 1113, and 1115 of the same SNET, etc. The level of trust between human member 1101 and other human members 1111, 1113, and 1115 can vary over time, depending on interactions with other SNET or circle members, interactions with third party or trusted authorities, and based on specific trust vouching over time. For example, consider the case where human member 1101 establishes a trust level of 15% initially. Establishment of an initial trust level has been previously discussed with reference to FIG. 10. In some embodiments, this trust level indicates a chain of trust that includes a trust level that takes into account not only the level of trust of the human member, but also the level of trust accorded to devices used by the human member 1101 to communicate with SNET infrastructure (not illustrated). In other embodiments, however, the human-to-human chain of trust is based only on the level of trust accorded to human member 1101.

When initially interacting with human member 1111, before human member has established a history of trusted interactions with SNET members the chain of trust between human member 1101 and human member 1111, from the point of view of human member 1111, is 15%. In some embodiments this percentage refers to either the likelihood that human member 1101 is who he claims to be, or the likelihood that the information provided by human member to human 1111 is accurate, truthful, and complete. In other embodiments, however, the trust percentage refers to an overall likelihood that that human member 1101 is trustworthy, and takes into account more than one factor. For purposes of this example, the indicated percentage refers to an overall level of trustworthiness. Thus, when human member 1111 receives information from human member 1101, for example a sports score, driving directions, contact information, a referral, a link to downloadable content, information related to accessing a device under control of the human member 1101, or the like, there is a 15% chance that the information is correct, usable, virus-free, or the like.

A level of trust can be built over time, based on various different interactions with the social network. Thus, for example, if a human member 1101 signs in an SNET under the name "Bob Smith" multiple times, and then signs into the same SNET using the name "Bob Jim Smith," the trust rate of human member 1101 may go down since he has used different names, which may raise some question as to whether or not Bob Jim Smith is the same person is Bob Smith. The amount of affect on the trust rating such changes may have can be dependent on the circumstances, so that in some cases use of the middle name "Jim" may actually increase the trust rating of human member 1101.

The trust level assigned to a member or trust chain can also be based, at least in part, on a history of providing trustworthy information. This trust history can be based on various metrics tracked by SNET infrastructure, third parties, or individual members. In some embodiments, members interacting with other members provide, to an SNET server, trusted authority, or other device or entity, feedback related to those interactions. Thus, part of a member's interaction history can include feedback from other members related to trustworthiness; positive feedback from other members can increase a member's trust rating, and negative feedback can decrease a member's trust rating. Furthermore, in some embodiments, members can vouch for other member's trustworthiness, based on one member's personal knowledge of the other member. In those cases where member vouching is used, the trust level of the vouching member can affect the weight given to any particular member's recommendation or vouching.

Assume, for purposes of this example, that over time, human member 1101 interacts numerous times with human member 1111 and other human members, and that during that time the information provided by human member 1110 has been trustworthy, and he thereby establishes a positive trust history. Because human member 1101 has established a history of providing trustworthy information, the trust level of human member 1101 increases over time, and by the time human member 1101 interacts with human member 1113, the level of trust has increased from 15% to 85%.

As noted earlier, levels of trust can be adjusted downward as well as upward. Thus, if human member 1101 begins providing untrustworthy information, his level of trust can decrease, for example from 85% to 65%, as illustrated by the trust level of the chain of trust between human member 1101 and human member 1115. This reduction rating can come about not only through providing untrustworthy information to human member 1115, but also through the failure of human member 1101 to act according to SNET norms, take promised actions, or otherwise act in a trustworthy manner with regard to other members of a social network or with regard to entities trusted by SNET members, such as trusted third party authorities, credit reporting agencies, or the like. Note that the member himself may attempt to accomplish the promised actions, but thwarted by untrustworthy devices that are infected with viruses, or the like. As another example, if a human member consistently vouches for other members, or consistently joins devices to the SNET, and the members and that are not trustworthy, the human members trust rating related to adding new members could be downgraded. Regardless of whether the apparent untrustworthiness of the human member 1101 is his fault or the fault of some device in the chain between human members, the trust level of the chain of trust can result in a lower trust level for human 1101. For example, if human member 1101 consistently uses an unreliable Internet service that prevents transfers of promised files, other human members can begin to doubt that promised files will actually be delivered by human member 1101, and provide negative feedback related to the trustworthiness of human member 1101.

Referring next FIG. 12, adaptation of a level of trust related to a device member to device member trust chain over time is illustrated according to various embodiments of the present disclosure. Many of the concepts related to human member to human member trust chains, which were previously discussed with respect to FIG. 11, apply equally to device member to device member trust chains. As illustrated in FIG. 11, device member 1201 is a member of a particular SNET, SNET circle, or the like, and over time interacts with other device members 1211, 1213, and 1214, which can be members of the same SNET circle, the same SNET, or a different SNET. Each of the illustrated device members 1201, 1211, 1213, and 1214 can be a parent SNET member, a child SNET member, or both. Furthermore, each of the illustrated devices can be a single device or a system, and in cases where one or more of device members 1201, 1211, 1213, and 1214 represent systems, the chain of trust represents a chain of trust between device member 1201 and a system in general, or between a device within a particular system. In some implementations, the chain of trust between a device and a system can include a chain of trust between different SNET circles hosted by the same device or different devices, or between generally unrelated social networks.

Device member 1214 is illustrated as having an established chain of trust with human member 1215. The chain of trust between device 1214 and human member 1215 can have a trust level unrelated to the trust level associated with the chain of trust between device 1201 and device 1214, for example if no interaction with human 1215 is involved in a particular transaction. However, in some cases the trust level associated with the chain of trust between device 1214 and human member 1215 is taken into account in establishing a level of trust between device member 1201 and device member 1214, even if no human interaction is involved in a particular transaction. Some such examples include situations in which human member 1215 is a primary operator or sponsor of device member 1214, and situations in which human member 1215 has administrator or some other high level of access to device member 1214 that would permit human member 1215 to tamper with device member 1214. The trust level of the chain of trust between device member 1214 and human member 1215 can also be taken into account when human member 1215 is specifically involved in a transaction.

The level of trust between device member 1201 and other device members 1211, 1213, and 1215 can vary over time, depending on interactions with other SNET or circle members, interactions with third party or trusted authorities, and based on specific trust vouching over time. For example, the chain of trust between device member 1201 and device member 1211 can have an initial value of 15%, which indicates a level of trust device member 1211 has for device 1201 at an initial time. Note that the level of trust assigned to a chain can be considered from the point of view of either device member 1201 or 1211, and in some cases the level of trust in a trust chain can be the same for both devices, for example when the chain of trust is based on how trustworthy the communications pathway is without taking into account the trust level of the endpoint device. In some such embodiments, the trust level of the chain of trust can be used by each endpoint device, or by SNET infrastructure, to obtain an overall level of trust for a particular communication or transaction. In some instances the trust level of the chain of trust can be used to determine overall levels of trust from the perspective of each endpoint device. In many circumstances, one endpoint device member may be trusted, for at least some transactions, more than the other endpoint device is trusted, so reference to a trust level of a chain of trust can be different depending on which device's perspective is used to evaluate the chain of trust.

Specific examples used herein assume that the trustworthiness of the chain of trust is evaluated from the perspective of device members 1211, 1213, and 1214, but similar principles apply to different perspectives. For example, the chain of trust between device member 1211 and device member 1201 is illustrated as 15%. Thus, from the point of view of device member 1211, there is a 15% chance that a transaction being conducted with device member 1201 is trustworthy. This 15% level of trust can take into account the trustworthiness of intermediate devices or systems (not illustrated) that are used for conducting the transaction, as well as the current trust level of device member 1201. But the level of trust assigned to a trust chain or a device is adaptive, and can change over time based on various circumstances.

As shown by the trust chain between device member 1213 and device member 1201, the trust level of device member 1201, and thereby the trust level associated with a device-to-device trust chain associated with device member 1201, can be increased over time by device member acting in a trustworthy manner. For example, if device member 1201 consistently provides advertised services as promised, e.g. within an advertised time or at an advertised level of quality. In contrast, the trust chain between device member 1214 and device member 1201 illustrates that the level of trust associated with a trust chain or device can also decrease over time. For example, if device member 1201 acquires a virus at some point after achieving its 85% trust rating, and it becomes known, for example, that a small percentage of files transferred by device member 1201 are infected, the trust rating of a device-to-device trust chain associated with device member 1201 can decrease, for example from 85% to 65%. The drop in trustworthiness can be caused by inclusion of another, less trustworthy SNET member in the chain of trust. In the illustrated example, including human member 1215, whose trustworthiness is rated at 35%, can be a factor in lowering the trust level of member device 1214 or the chain of trust between member device 1201 and member device 1214.

In various embodiments, different trust levels can be assigned to the same trust chain for different purposes or types of transactions. For example, the same device member can have a high trust rating related to providing the type or quantity of services advertised, but a lower rating related to the advertised quality of those services. As another example, the same device or trust chain can have a high trust level related to identity, and a lower trust level related to information security.

Referring next to FIG. 13, an example of nesting of trust levels is illustrated and discussed according to various embodiments. FIG. 13 illustrates how multiple, nested levels of trust can affect the adaptive trust level or rating of an SNET member, whether that member be a human, device, service, or otherwise.

Consider, for example, a human who connects to an SNET through two or more different devices. In such a situation, another SNET member may need to determine not only whether the human member can be trusted, but also whether the devices through which the human connects to the SNET can be trusted. And if the trustworthiness of the human member and the devices are established by other members vouching for their trustworthiness, consideration should be given to the trustworthiness of the vouching member? Thus, a vouching member's recommendation, may be discounted if the vouching member's credibility is low. But what if the vouching member's credibility is reasonably high; but was based only on interactions with less trustworthy members, or based on interactions over a short period of time? In essence, to determine the trustworthiness of an individual, the basis of that trustworthiness can, in some embodiments be examined in an iterative manner, all the way back to the initial source of trust. In colloquial language, how much trust you grant to a friend of a friend of a friend depends on the trustworthiness of each friend in the chain of friends.

As used in the following example, an adaptive trust probability, which represents an overall level of trust of that particular member or device, is assigned to a human member or device 1301. Similar principles can be applied where the adaptive trust probability represents particular types or categories of trust, rather than an overall trust. The trust rating for the human member or device 1301 depends upon both an adaptive trust probability contribution from a first human voucher 1303, and upon the adaptive trust probability contribution from a trusted authority 1331. In some embodiments, the adaptive trust probability of both human voucher 1303 and trusted authority 1331 can be used to calculate an adaptive trust probability for human member or device 1301.

Various probabilistic algorithms can be used, as known to those of skill in the art of statistics, but in at least one embodiments the trust probabilities of human voucher 1303 and trusted authority 1331 are simply multiplied together, or otherwise weighted. In some such cases, the trust probability of the trusted authority 1331 can be given greater weight than the trust probability of human voucher 1303, by virtue of its position as a trusted authority. So, for example, if the adaptive trust probability of trusted authority 1331 is 90%, and the adaptive trust probability of the first human voucher 1303 is 40%, the adaptive trust level of member human or device 1301 can be:

Trust Level=0.9*0.4=0.36, (no weighting); or
Trust Level=(4*(0.9)+(0.9*0.4))/5=0.792), (weighted contribution from trusted authority 1331).
Other weighting schemes are also within the scope of the present disclosure.

As noted above, the adaptive trust levels of both trusted authority 1331 and human voucher 1303 are also based on underlying trust levels. For example, the adaptive trust probability of first human voucher 1303 is based on adaptive trust probability of underlying human voucher 1311 and the adaptive trust probability conferred to first human voucher 1321 by SNET interactions. The adaptive trust probability of underlying human voucher 1311 is, in turn, dependent on inherent vouching 1323 through interactions with other members 1313, reported vouching 1325 based on feedback from other members 1315, and contributions from a trusted authority 1317. Similarly, the adaptive trust probability of trusted authority 1331 is based on time, and thoroughness of the trust processing 1333, which in turn is based on the probability of the authority's ability to establish justifiable trust 1335, the probability associated with the member being evaluated by the trust authority 1337, as well as information age and other adaptive probability update factors 1339.

As can be seen from the illustrated example, therefore, the trust level accorded to member human or device 1301 is dependent upon contributions from multiple nested, or underlying, trust layers, each of which can apply the same or different probabilistic methods to obtain a trust level, which is combined with other trust levels to obtain an aggregate or combined trust level.

Referring next FIG. 14, a flowchart illustrating a method 1400 according to various embodiments of the present disclosure is illustrated and discussed. At block 1403 a social device establishes membership in a first circle of the social network. Membership can be established in the first circle of the social network using various methods and procedures previously discussed, including, for example, sending a request to a host of a social network requesting membership in the first circle of the social network in passing authorization invalidation hurdles as required by the social network circle to which membership is requested. As used herein, the term membership may also refer to temporary docking to a social network circle, or the like. In response to establishing membership in the first social network circle, as illustrated by block 1405 the social device obtains and stores the secret associated with the first social network circle. The secret can be obtained via communication with a host of the social network, via electronic communication with one or more members of the first social network circle, or via some other pathway. Regardless of the way in which the secret or key is obtained for the first network circle, the social device can store this secret using various methods such as a key store, segregated and protected memory, a security key fob, or the like.

As illustrated at block 1407, membership is established in a second social network circle. The second social network circle may be part of the same social network as the first social network circle, or part of a different social network. At block 1409 the secret, circle key, token, or other security information associated with the second social network circle is received and stored. The information for the second social network circle can be stored in a different memory than that used to store the information associated with the first social network circle, or in a single memory that has been segregated. In some embodiments, the secrets for the first social network circle and the second social network circle can be stored in a single key store if desired.

Once membership in both social network circles has been established, in the secrets associated with each of the network circles are stored, the social device is in a position to communicate and participate in both network circles. Assuming for purposes of the present example only, that the first circle and second circle are part of the same social network, as illustrated at block 1411 a communication is received via the social network. As illustrated at block 1413, a check is made to determine whether the communication received via the social network is coming from the first social network circle. If the communication received is from the first social network circle, then the social device can respond to the communication using the secret associated with the first network circle at block 1415.

If it is determined at block 1413 that the communication is not from the first social network circle, a check is made at block 1417 to determine whether the communication is from the second network circle, of which the social device is also a member. If the communication is determined that block 1417 to be from the second network circle, social device can communicate with the social network circle, and respond to the communication using the circle secret associated with the second social network circle, as illustrated by block 1419.

As illustrated at block 1421, if the communication is from neither the first social network circle nor the second social network circle the device can refuse to respond to the communication via the social network. In some embodiments, the refusal to allow access via the social network can include simply ignoring the communication, sending a response that the source of the communication is not authorized access resources of the social network, or some other appropriate response indicating that the requester communication is being refused.

Referring next FIG. 15, a flowchart illustrating method 1500 is illustrated and discussed according to various embodiments of the present disclosure. At block 1501 a request for membership is received at an SNET circle. The request for membership can be received at a host of the SNET circle, at a host of the SNET, even if the host of SNET is not also hosting the SNET circle, at a member of the SNET circle, or at a non-circle member device authorized according to circle protocol to process requests for membership in the SNET circle.

As illustrated at block 1503, in response to receiving a request for membership members of the SNET circle can be polled for approval of the membership request. The information sent to members requesting approval of the request can include a request to vouch for the prospective member. In some instances, the request can also include a selectable list of predefined categories or reasons for approval or disapproval of the request. For example the list may include items related to a length of time an SNET member has known the prospective member, whether the SNET member knows the prospective member through social, business, or professional relations, or the like.

At block 1505 a check is made to determine whether more verification is required before allowing the prospective member to join or dock with the social network circle. If more verification is required block 1507 illustrates that a third-party trust verification can be performed. Third party verification can, in some instances, include integrating trusted authorities such as driver's license, passport services, biometric data, notary process, universities, companies, etc., into a membership environment at block 1509. In some implementations, trust authorities can provide a trust digital signature that can be appended to an SNET account. For example, the department of motor vehicles can be used to very a driver's license number; an embassy can be used to verify passport information; a notary public could be used to verify age; a bank can be used to confirm a digital wallet; etc.

If the third-party trust verification is successful the communication channel can be secured, as illustrated at block 1513, using various public/private key encryption techniques, or otherwise. Once the communication channel has been secured at block 1513, the prospective member can be sent the SNET circle key at block 1515, which will allow the new member to communicate with other members in a secure fashion. As illustrated by block 1505, third-party trust verification can be bypassed in some instances. Furthermore, although not specifically illustrated, third-party trust verification may be performed in place of sending members of the SNET circle a request for approval. As illustrated by block 1511, if the prospective member is not verified, membership or docking in the SNET circle may be refused.

Referring next to FIG. 16, a flowchart illustrating method 1600 for removing a current member's access to an SNET circle is illustrated and discussed according to various embodiments of the present disclosure. As illustrated at block 1607, a notice that a member is being removed or undocked from a social network circle, or whose access is otherwise being removed from one or more rings or circles of a social network, is received. At block 1609 a check is made to determine whether the member being removed is a member of the currently considered SNET circle or ring. If not the method proceeds to block 1615, where determination is made as to whether there are more circles or rings to process. If there are more circles or rings to process, the method returns to block 1609, where a check is made to determine whether the member being removed is a member of the next circle or ring to be considered.

Once it is determined that block 1609 that the member being removed is a member of the currently considered SNET circle or ring, a new circle secret can be determined that block 1611. The new circle secret can be, in some instances, a private key encoded using a public key. In other embodiments, however, different types of circle secrets can be used. The new circle secret can be determined by a host of the social network, or a host of the social network circle, if those two entities are different. Thus, in some instances, a host of the social network may receive the notice of member removal at block 1607, and send a request to the host of the SNET circle requesting that host to generate a new circle secret, which can be returned to the host of the social network for distribution at block 1613. In other embodiments, a member device can act as the host of both the social network and the SNET circle, or various functions used to implement the social network or social network circle can be distributed among various different devices.

After the new circle secret has been distributed to the remaining members at block 1613, another check can be made at block 1615 to determine whether there are any more SNET circles from which the member device may need to be removed. If there are more SNET circles to which the member might have access, the method returns to block 1609. If there are no more SNET circles to which the current member is known to have access, method 1600 ends. In cases where removal of a member of an SNET circle is handled by the SNET circle itself, as opposed to being handled by an overall social network with multiple sub-circles, the method 1600 illustrated in FIG. 16 essentially collapses to determining new circle secrets and distributing the new circle secrets to the remaining members of the SNET circle but not to the member being removed from the SNET circle.

Referring next FIG. 17, a flowchart illustrating a method 1700 used to verify that non circle-members are authorized to receive circle content, is illustrated and discussed according to various embodiments of the present disclosure. At block 1701 a request for protected content is received from the member of another SNET circle, or an entity that is not a member of the current SNET circle. In some instances, the request can come from within the same social network, but from an SNET circle having a different level of trust. In other instances the request may come from a member of a different social network, or from a device that is not a member of any social network or social network circle. For purposes of this example, it can be assumed that the request comes from another member of the same social network but from a different SNET circle. The same or similar techniques can be used to handle requests from other types of sources.

A block 1703, a determination is made whether members of the SNET circle from which the request is received is authorized to access the particular resource requested. Thus, for example, if a request for audio video content is received from an SNET circle having a trust level that is higher or equal to the trust level of the SNET circle from which the audio video content is requested, it may be determined that the requester is authorized to receive the content simply on the basis of the requester's membership in the other SNET circle.

As illustrated at block 1709, if members of the SNET circle from which the request for protected content is received has a lower trust level than the trust level of the SNET circle holding the protected content, access to the protected content can be denied. In some applications, rather than simply denying the request, reduce quality content can be delivered based on circle settings or parameters. Thus, for example, if the requester is a member of the circle that has limited trust, a reduce quality version of the protected content can be sent to the member of the other SNET circle. If, however, the requester is a member of an SNET circle having a very low trust level, transmission of the protected content can be denied. Furthermore, method 1700 can be used in conjunction with various digital rights management (DRM) or content protection standards are schemes without departing from the spirit and scope of the present disclosure.

If it is determined at block 1703 that members of the SNET circle from which the request is received are authorized an additional check can be made as illustrated at block 1705 to determine whether the requester is the type of member or device authorized to receive protected content. For example, even though members of a particular SNET circle may be authorized to receive the protected content, there may be a block on sending content to particular types of recording devices. Thus, a digital video disk (DVD) recorder that is a member of an SNET circle in which members are generally permitted to receive the protected content may still be blocked from receiving the protected content because of its device or member type.

As illustrated at block 1707, if it is determined that the requester is a member of an SNET circle authorized to receive protected content, and is also of a device or member type authorized to receive protected content, the protected content can be sent to the requesting member. To continue with the previous example, protected content may be permitted only to non-recording devices, regardless of whether circle members are otherwise authorized to receive the protected content. Thus, a television display that is a member of the same SNET circle to which the previously mentioned DVD recorder belongs, would be permitted to receive the protected content even though the DVD recorder might not be permitted to do so.

FIG. 18 is a schematic block diagram of an exemplary social device 1800 comprising integral functionality operable to support social network circle/sub-circle membership and communications in accordance with the invention. In at least one embodiment, social device 1800 can be implemented as a social server. In the illustrated embodiment, a communication interface and transceiver circuitry 1802 is operable to perform wired or wireless communications between social device 1800 and an SNET circle/sub-circle 1822 over one or more communication channels. Depending on the capabilities and configuration of the social device 1800, communications with an SNET may be unilateral or bidirectional/interactive, and utilize either a proprietary or standardized communication protocol. In some embodiments, a member or resource within an SNET circle can accesses a server, social device, or circle resources such as an Internet-based resource identified by a URL reference, associated with a second, secure SNET circle or sub-circle.

The social device 1800 further includes processing circuitry 1804 operable to process and manage communications, services and associations between the device and other entities including members of an SNET circle 1822, third parties, software agents, etc. More particularly, the processing circuitry 1804 may include, for example, a SNET management application 1812 comprising one or more of docking logic 1814, communication protocol control 1816 and security/authentication functionality 1818.

The social device 1800 further may utilize profile information that can take many forms and be maintained in a static or dynamic memory, such as memory 1824. Such profile information enables a social device and/or user to present an image of itself and its capabilities to other members of an SNET. As described more fully below, device and user profile information 1806 and 1808 may be utilized in various ways in accordance with the invention to facilitate a variety of social interactions. Depending on the capabilities and requirements of a particular device (and other members of an SNET), a device or user profile may be static or dynamic.

In addition to memory 1824 used to store device and user profile information 1806 and 1808, social device 1800 can include protected memory 1809 to implement a keystore, or used to store other sensitive information. In various embodiments protected memory 1809 can be segmented and used to store keys or other circle secrets associated with multiple different SNET circles with which the social device interacts. For example, a portion of protected memory can be dedicated to interactions with circle 1, another portion dedicated to circle 2, and yet a third portion dedicated to circle 3. Any of these circles can belong to the same or different social networks. Furthermore, although not specifically illustrated, multiple different SNET circles can use different profile information, and device profile information 1806 and user profile information 1808 can also be stored in a protected, segregated memory that allows information associated with any particular SNET circle to be used substantially only in conjunction with communications related to that SNET Circle.

In certain embodiments, the social device 1800 interacts with a user(s) via user interface circuitry 1810. User input to the social device 1800 may include, for example, data entry through a keypad, touchscreen, remote control device, gaming controller, device control buttons, voice or gesture commands, storage device, etc. Authorized access to or control of the social device 1800 can be facilitated through unique biometric identifiers, passwords, token-based identification, trusted authorities or documents such as a driver's license or passport, and like authentication means.

Social device 1800 also performs core or underlying functionality 1820, various examples of which are described herein. Alternatively, the social device may primarily function as a social networking interface or communication device, or be programmable to perform specific functions within an SNET circle/sub-circle.

Referring now to FIG. 19, a schematic block diagram is shown for a social device 1901 operable to support various interactions between other social devices and social systems in accordance with an embodiment of the invention. The social device 1901 is configured with a variety of functions that enable it to operate in a social device hierarchy comprising social (S) devices, social "parent" (SP) devices and social "child" (SC) devices. For example, a social parent device may enable a docked social child device to access resources of the parent device and/or connect to and interact with (directly or indirectly) with a social network. The social child device may be configured with inherent social capabilities, or gain access to such capabilities from or through an associated parent device. Further, a human SNET member might have associated social child devices, or be served by a social parent device via a user I/O interface (523).

A social device 1901 according to various embodiments and applications of the invention may also concurrently or selectively function as a social device, SP device, SC device, or even a "grandparent" device that supports (e.g., in a multi-hop environment) a parent device in a SNET group. In some embodiments, social device 1901 can also function as part of SNET infrastructure 1909, and be used to implement server functionality. Dynamic and static hierarchical associations between SP and SC devices may be established in a selective, automatic or automated manner. Further, a social device 1901 may take many forms including, without limitation, a smartphone, personal computer, server, tablet device, access point, gateway, network switch/hub, bridging device, set top box, or other device enabled with social capabilities.

In the illustrated embodiment, the social device 1901 is communicatively coupled to a SNET infrastructure 1909 and/or social parent system 1911 via upstream social communication interface circuitry 1907. Likewise, downstream social peer and/or child communication interface circuitry 1913 enables coupling with a social child device 1915, social peer device 1917 and/or social parent system (device) 1919. Social resources of both upstream and downstream devices may be accessible to one another via the social device 1901.

The social device 1901 of this embodiment includes social resources 1903 that, along with external SNET resources, are managed by a social resource management module 1905 and accessible to at least one other SNET group member. Specific social resources 1903 may include user I/O interfaces 1923, general purpose and dedicated hardware processing circuitry 1924, peripheral circuitry and components 1925 (which may or may not have social capabilities), communication bandwidth and credit determination functionality 1926, switching/bridging functions 1927, application software 1928, etc.

Among other functions, the social resource management module 1905 comprises allocation, arbitration and scheduling functionality 1921, as well as the functionality for establishing, regaining and relinquishing control processing operations 1922. It is noted that counterpart resource management functionality may be present in the SNET infrastructure 1909 and/or other SNET nodes.

In one exemplary embodiment wherein the social device 1901 comprises a switching bridge, bandwidth capacity may be dynamically allocated by allocation, arbitration and scheduling functionality 1921. Access to bandwidth capacity and other resources of the social device 1901 might be available only upon request or per arbitration functions, and selectively terminated when excessive bandwidth/resources are consumed or requested.

SNET circle communications in accordance with various embodiments described herein can utilize a variety of transmission protocols. By way of example, most communication over the Internet is currently performed in accordance with the Transmission Control Protocol (TCP) and User Datagram Protocol (UDP). As is known, TCP typically provides an intermediate level of communication services between, for example, an application program and the Internet Protocol (IP). Port numbers are used to identify end-points for sending and receiving applications on a host (often referred to as "Internet sockets" or "network sockets"). Internet sockets facilitate delivery of incoming data packets to an appropriate application process or thread, as determined by a combination of local and remote (e.g., SNET circle) IP addresses and port numbers. In some embodiments, the Real-time Transport Protocol (RTP) running over UDP may be employed for media streaming applications, real-time multiplayer gaming, voice over IP (VoIP), and like applications that are tolerant of a certain level of packet loss and may not require a dedicated end-to-end-connection.

In some embodiments, transmissions between SNET circle members and between members of different SNET circles can employ various port addressing and masking techniques to further enhance security. IDs of transmitting devices can be protected by blocking snooping of headers, use of internal IP addresses, proxies, security agents, VPN tunneling, or the like.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contrary, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A secure social network infrastructure having a plurality of circles, each of the plurality of circles being defined by at least a first member, the secure social network infrastructure being supported by a communication network, the secure social network infrastructure comprising:
    a social user device that supports both communication pathway security and a human member;
    a social networking system that supports independent membership of the social user device and communication pathway security in communicating with the social user device via the communication network;
    the social networking system having a plurality of security requirements associated with a first circle of the plurality of circles, wherein the plurality of security requirements includes an individual authentication requirement and at least one trust requirement in addition to the individual authentication requirement;
    the social networking system configured to:
        attempt to authenticate both the human member and the social user device;
        determine whether the at least one trust requirement is satisfied;
        determine that the human member has access rights to the first circle based on authenticating both the human member and the social user device, and determining that the at least one trust requirement is satisfied;
    wherein:
        if the authentication attempt at least partially fails, the social networking system provides partial access to the first circle of the plurality of circles; and at least a portion of the authentication attempt is repeated over time in an attempt to maintain authentication security.

2. The secure social network infrastructure of claim 1, wherein the authentication attempt associated with the social user device involves a security key related exchange.

3. The secure social network infrastructure of claim 1, wherein, if the authentication attempt at least partially fails, the social networking system attempts to interact with a second human member.

4. The secure social network infrastructure of claim 1, wherein a second human member can trigger a further authentication attempt.

5. The secure social network infrastructure of claim 1, wherein the social networking system provides virtual private networking support for the first circle of the plurality of circles.

6. The secure social network infrastructure of claim 1, wherein the social networking system provides firewall service support for the first circle of the plurality of circles.

7. Device circuitry used in a first device member of a social network circle, the social networking circle being hosted by a social networking system, the social networking circle having a second device member, the device circuitry comprising:
communication interface circuitry through which both authenticity as a device member and authorized participation of the device member in the social networking circle are established, wherein establishing authenticity includes determining whether identification provided by the device member is authentic based, at least in part, on a level of trust associated with the device member;
processing circuitry that manages secure communication relating to the second device member via the social networking circle;
the processing circuitry configured to utilize the social networking circle to set up a secure communication pathway to the second device member via the communication interface circuitry;
wherein:
if the establishing authenticity at least partially fails, the social networking system provides partial access to the first circle of the plurality of circles; and
at least a portion of the establishing authenticity is repeated over time in an attempt to maintain authentication security.

8. The device circuitry of claim 7, wherein the secure communication pathway flows through the social networking system.

9. The device circuitry of claim 7, wherein the secure communication pathway is managed via the social networking system, but carried out in a point to point manner.

10. The device circuitry of claim 7, wherein the secure communication pathway is established after first establishing first circle security with the first device member and first circle security with the second device member.

11. A social network infrastructure supporting a first device, a second device, and a first human member via a communication network, the social network infrastructure comprising:
a social networking system supporting a plurality of circles, a first circle of the plurality of circles being established by the first human member, and the first device being an established member of the first circle, wherein membership of the first device is independent of membership of the first human member;
the social networking system, to service an attempt to dock the first device in the first circle, configured to perform a first secure interaction with the first device, the first secure interaction being associated with the first device for participation in the first circle;
the social networking system, to service an invitation to add the second device as a member of the first circle, configured to perform a second secure interaction with the second device, the second secure interaction being associated with initial establishment of participation by the second device in the first circle, wherein the second secure interaction is based on satisfying security requirements including both an authentication requirement and at least one trust requirement in addition to the authentication requirement;
wherein:
if the attempt to dock at least partially fails, the social networking system provides partial access to the first circle of the plurality of circles; and
at least a portion of the second secure interaction is repeated over time in an attempt to maintain authentication security.

12. The social network infrastructure of claim 11, wherein the second secure interaction is based at least in part on support from a trust authority.

13. The social network infrastructure of claim 11, wherein established members of the first circle communicate using communications encrypted using a circle key.

14. A method for use by a social network device, the method comprising:
transmitting a message via a communications interface included in the social network device, the message requesting social network docking;
receiving, via the communications interface, secure authentication interaction associated with authentication of the social network device, independent of a human member, wherein the authentication includes determining whether an identifier provided by the social network device is authentic based, at least in part, on a level of trust associated with the social network device;
providing secure authentication processing at the social network device;
receiving, via the communications interface, confirmation of docking into a first social circle within a social network, the social network having a plurality of social circles;
interacting via the first social circle using at least a first security key;
determining access rights for a human member employing the social network device based, at least in part on the confirmation of docking;
wherein:
if the authentication at least partially fails, the social network provides partial access to the first circle of the plurality of circles; and
at least a portion of the authentication attempt is repeated over time in an attempt to maintain authentication security.

15. The method of claim 14, wherein the docking also includes a second social circle, and wherein the method further comprises interacting via the second social circle using at least a second security key.

16. The method of claim 15, further comprising attempting to securely maintain the first key and the second key.

17. The method of claim 14, further comprising attempting to securely maintain a plurality of security secrets associated with the plurality of social network circles.

18. The method claim 17, wherein at least a first of the plurality of security secrets being used to assist in authenticating members of the first circle.

19. The method of claim 14, wherein the at least the first security key comprises a plurality of keys corresponding to elements of the first social circle.

20. The method of claim 19, wherein the elements comprise at least one member device.

21. The method of claim 19, wherein the elements comprise at least one service.

* * * * *